United States Patent
Jang et al.

(10) Patent No.: US 12,200,789 B2
(45) Date of Patent: Jan. 14, 2025

(54) ELECTRONIC DEVICE FOR TRANSMITTING DATA PACKETS IN BLUETOOTH NETWORK ENVIRONMENT, AND METHOD THEREFOR

(71) Applicant: Samsung Electronics Co., Ltd., Gyeonggi-do (KR)

(72) Inventors: Wonkyoung Jang, Gyeonggi-do (KR); Donghyeon Kim, Gyeonggi-do (KR); Doosu Na, Gyeonggi-do (KR); Bokun Choi, Gyeonggi-do (KR); Yongsang Yun, Gyeonggi-do (KR); Sunkey Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

(21) Appl. No.: 17/708,197

(22) Filed: Mar. 30, 2022

(65) Prior Publication Data

US 2022/0225452 A1    Jul. 14, 2022

Related U.S. Application Data

(63) Continuation of application No. PCT/KR2020/013133, filed on Sep. 25, 2020.

(30) Foreign Application Priority Data

Oct. 2, 2019    (KR) .................. 10-2019-0122484

(51) Int. Cl.
*H04W 76/15*    (2018.01)
*H04L 5/00*    (2006.01)
*H04W 4/80*    (2018.01)

(52) U.S. Cl.
CPC .......... *H04W 76/15* (2018.02); *H04L 5/0055* (2013.01); *H04W 4/80* (2018.02)

(58) Field of Classification Search
None
See application file for complete search history.

(56) References Cited

U.S. PATENT DOCUMENTS

| 8,768,252 B2 | 7/2014 | Watson et al. |
| 9,020,437 B2 | 4/2015 | Watson et al. |
| 9,621,987 B2 | 4/2017 | Watson et al. |
| 9,794,753 B1 * | 10/2017 | Stitt ...................... H04W 12/06 |

(Continued)

FOREIGN PATENT DOCUMENTS

| KR | 10-2017-0038825 A | 4/2017 |
| KR | 10-2018-0122407 A | 11/2018 |
| KR | 10-2018-0132541 A | 12/2018 |

*Primary Examiner* — Gregory B Sefcheck
(74) *Attorney, Agent, or Firm* — Cha & Reiter, LLC

(57) ABSTRACT

An electronic device is provided. The electronic device includes wireless communication circuitry, a processor, and a memory. The processor may be configured to establish a first communication link with a first external electronic device using a first address of the electronic device through the wireless communication circuitry, establish a third communication link with the first external electronic device using the second address or a third address of the electronic device, and transmit control information to the first external electronic device over the third communication link while receive content data packet from the first external electronic device over the first communication link.

11 Claims, 13 Drawing Sheets

(56) References Cited

U.S. PATENT DOCUMENTS

| | | | |
|---|---|---|---|
| 9,949,205 B2 | 4/2018 | Newham | |
| 10,244,468 B2 | 3/2019 | Newham | |
| 10,616,710 B2 | 4/2020 | Stitt et al. | |
| 10,681,591 B2 | 6/2020 | Lee et al. | |
| 10,701,629 B2 | 6/2020 | Newham | |
| 10,834,738 B2 | 11/2020 | Paycher et al. | |
| 10,848,969 B2* | 11/2020 | Chen | H04W 12/06 |
| 11,272,861 B1* | 3/2022 | Filipovic | A61B 5/1117 |
| 11,368,775 B1* | 6/2022 | Prelogar | H02J 7/00034 |
| 11,877,842 B1* | 1/2024 | Filipovic | A61B 3/14 |
| 2012/0058727 A1 | 3/2012 | Cook et al. | |
| 2013/0316642 A1 | 11/2013 | Newham | |
| 2015/0264724 A1 | 9/2015 | Yao | |
| 2017/0215113 A1 | 7/2017 | Lee et al. | |
| 2017/0223579 A1 | 8/2017 | Lee et al. | |
| 2017/0223615 A1 | 8/2017 | Lee et al. | |
| 2017/0303080 A1 | 10/2017 | Stitt et al. | |
| 2017/0303090 A1 | 10/2017 | Stitt et al. | |
| 2018/0091887 A1* | 3/2018 | Minoo | H04R 1/1091 |
| 2018/0152917 A1* | 5/2018 | Knaappila | H04W 4/80 |
| 2018/0199282 A1 | 7/2018 | Newham | |
| 2018/0352558 A1 | 12/2018 | Paycher et al. | |
| 2019/0098494 A1* | 3/2019 | Pry | H04W 12/068 |
| 2019/0098678 A1* | 3/2019 | Von Dentz | H04L 69/24 |
| 2019/0182765 A1 | 6/2019 | Newham | |
| 2019/0279169 A1* | 9/2019 | Ivanovic | G06Q 10/1097 |
| 2019/0327778 A1* | 10/2019 | Morris | H04W 88/04 |
| 2020/0110439 A1* | 4/2020 | Deng | H04R 1/1041 |
| 2020/0145781 A1* | 5/2020 | Kuenzi | H04W 4/021 |
| 2020/0228919 A1 | 7/2020 | Stitt et al. | |
| 2020/0252993 A1* | 8/2020 | Srivastava | H04W 4/80 |
| 2020/0278826 A1* | 9/2020 | Patil | H04L 65/762 |
| 2020/0322788 A1* | 10/2020 | Batra | H04W 8/24 |
| 2020/0412862 A1* | 12/2020 | Oh | H04W 76/14 |
| 2020/0413462 A1* | 12/2020 | Cheong | H04B 17/318 |
| 2021/0045032 A1* | 2/2021 | Choi | H04W 12/06 |
| 2021/0126971 A1* | 4/2021 | Tilchen | G01D 4/006 |
| 2021/0345044 A1 | 11/2021 | Watson et al. | |
| 2021/0345082 A1* | 11/2021 | Li | H04W 36/00837 |
| 2021/0377713 A1* | 12/2021 | Wei | H04W 52/0219 |
| 2022/0078864 A1* | 3/2022 | Yang | H04W 72/56 |

\* cited by examiner

ELECTRONIC DEVICE FOR TRANSMITTING DATA PACKETS IN BLUETOOTH NETWORK ENVIRONMENT, AND METHOD THEREFOR

CROSS-REFERENCE TO RELATED APPLICATION(S)

This application is a Continuation of and claims priority under 35 U.S.C. § 120 to PCT International Application No. PCT/KR2020/013133, which was filed on Sep. 25, 2020, and claims priority to Korean Patent Application No. 10-2019-0122484, filed on Oct. 2, 2019, in the Korean Intellectual Property Office, the disclosure of which are incorporated by reference herein their entirety.

BACKGROUND

Technical Field

One or more embodiments disclosed herein generally relate to an electronic device for transmitting data packets in a Bluetooth network environment and a method thereof.

Description of Related Art

The Bluetooth standard defined by the Bluetooth Special Interest Group (SIG) defines a protocol for short-range wireless communication between electronic devices. In the Bluetooth network environment, electronic devices may transmit or receive data packets, including content such as texts, voices, images, or videos, in a specified frequency band (e.g., about 2.4 gigahertz (GHz)).

For example, user equipment (UE), such as smartphones, tablets, desktop computers, or laptop computers, may transmit data packets to another UE or an accessory device through the Bluetooth network environment. The accessory device may include, for example, earphones, headsets, speakers, mice, keyboards, chargers, display devices, etc.

SUMMARY

The Bluetooth network environment may be implemented in a topology that includes one user device (e.g., a device under test (DUT)) for transmitting data packets and a plurality of devices for receiving data packets from the user device. For example, when earphones (or a headset) are connected with a smartphone, the earphone worn on the left ear of the user and the earphone worn on the right ear of the user may receive data packets from the smartphone.

In wireless data transmission, each of the plurality of devices receiving the data packets may establish a separate link with the host or master user device. In this case, because the user device need to establish a plurality of links to transmit data packets to the plurality of devices, resources and power consumed by the user device may increase, which may reduce battery life. Furthermore, as the number of devices connected wirelessly to the user device increases, the power consumed by the user device and the latency between transmission and reception of the data packets reach the devices may also increase.

Various embodiments disclosed in the disclosure may provide an electronic device and a method for addressing the above-mentioned problems in the Bluetooth network environment.

In accordance with an aspect of the disclosure, an electronic device is provided. The electronic device may include wireless communication circuitry, a processor operatively connected with the wireless communication circuitry, and a memory operatively connected with the processor. The memory may store one or more instructions that, when executed, cause the processor to establish a first communication link with a first external electronic device using a first address of the electronic device through the wireless communication circuitry, establish a second communication link with a second external electronic device using a second address of the electronic device through the wireless communication circuitry, transmit information about the first communication link, the information configured for estimating a channel of the first communication link, to the second external electronic device over the second communication link, and establish a third communication link with the first external electronic device using the second address or a third address of the electronic device, after transmitting the information about the first communication link to the second external electronic device.

In accordance with another aspect of the disclosure, an electronic device is provided. The electronic device may include wireless communication circuitry, a processor operatively connected with the wireless communication circuitry, and a memory operatively connected with the processor. The memory may store one or more instructions that, when executed, cause the processor to establish a first communication link with a first external electronic device based on a first address of the first external electronic device through the wireless communication circuitry, establish a second communication link with a second external electronic device using a first address of the electronic device through the wireless communication circuitry, receive information about a third communication link connected between the first external electronic device and a third external electronic device over the first communication link from the first external electronic device, monitor the third communication link based on the information about the third communication link to receive a data packet from the third external electronic device, receive first reception information of the second external electronic device, the first reception information being about the data packet, from the second external electronic device over the second communication link, and transmit a response message generated based on the first reception information of the second external electronic device and second reception information of the electronic device, the second reception information being about the data packet, to the third external electronic device over the third communication link.

In accordance with another aspect of the disclosure, an electronic device is provided. The electronic device may include wireless communication circuitry, a processor operatively connected with the wireless communication circuitry, and a memory operatively connected with the processor. The memory may store one or more instructions that, when executed, cause the processor to establish a first communication link with a first external electronic device using a first address of the electronic device through the wireless communication circuitry, establish a second communication link with a second external electronic device using a second address of the electronic device through the wireless communication circuitry, and transmit information about the first communication link, the information configured for estimating a channel of the first communication link, to the second external electronic device over the second communication link. The second external electronic device may include a sound output device. The electronic device may include a charging device of the second external electronic device.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which.

With regard to description of drawings, the same or similar denotations may be used for the same or similar components.

DETAILED DESCRIPTION

According to certain embodiments disclosed in the disclosure, the electronic device may reduce unnecessary resources consumed in the Bluetooth network environment, and also reduce delays in data processing.

Hereinafter, various embodiments of the disclosure may be described with reference to accompanying drawings. However, it should be understood that this is not intended to limit the disclosure to specific implementation forms and includes various modifications, equivalents, and/or alternatives of embodiments of the disclosure.

Hereinafter, a configuration of an electronic device according to an embodiment will be described with reference to FIG. 1.

Figure 1:
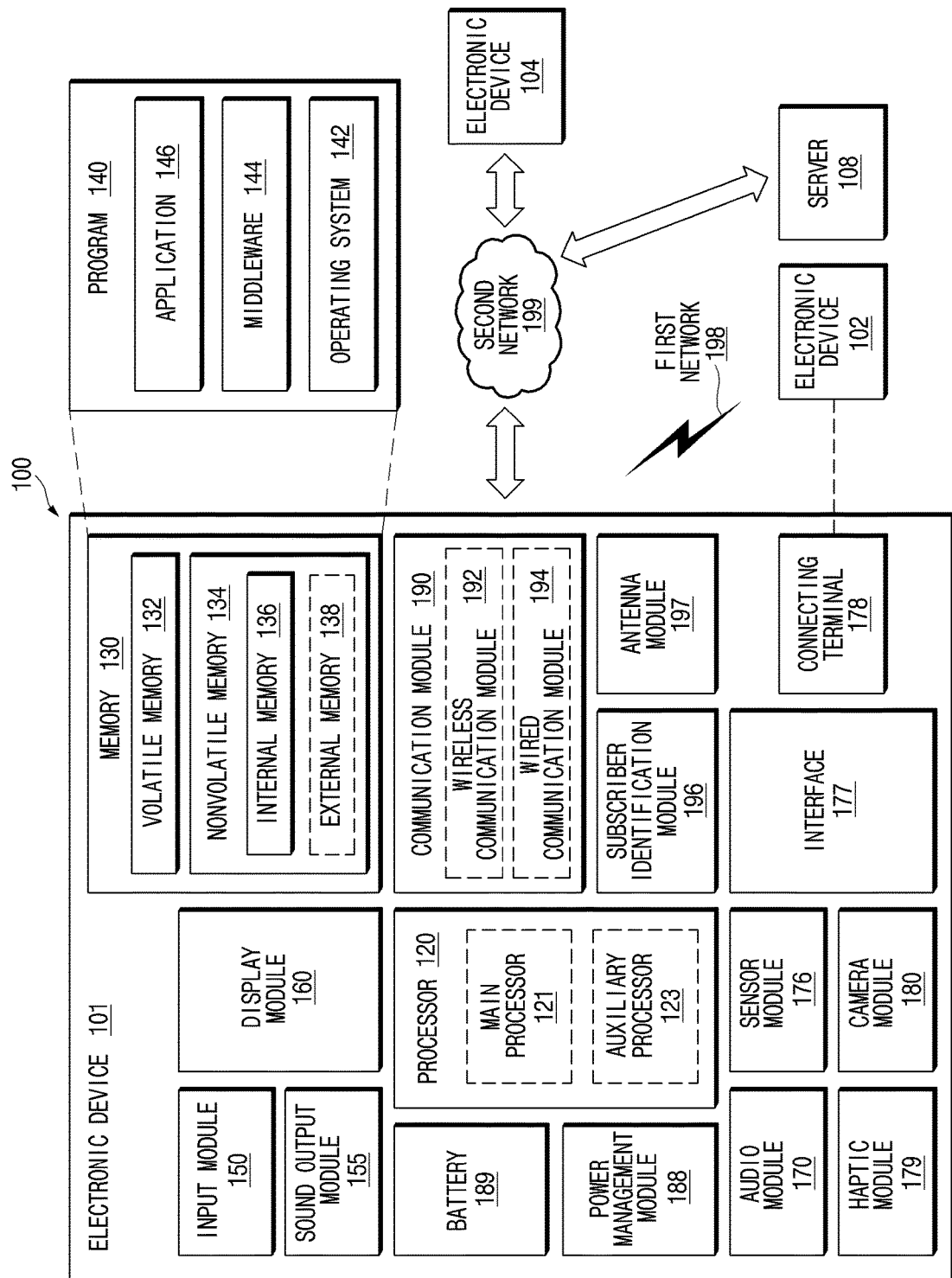
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Hereinafter, operations of a plurality of devices according to an embodiment will be described with reference to FIGS. 2 and 3.

Figure 2:
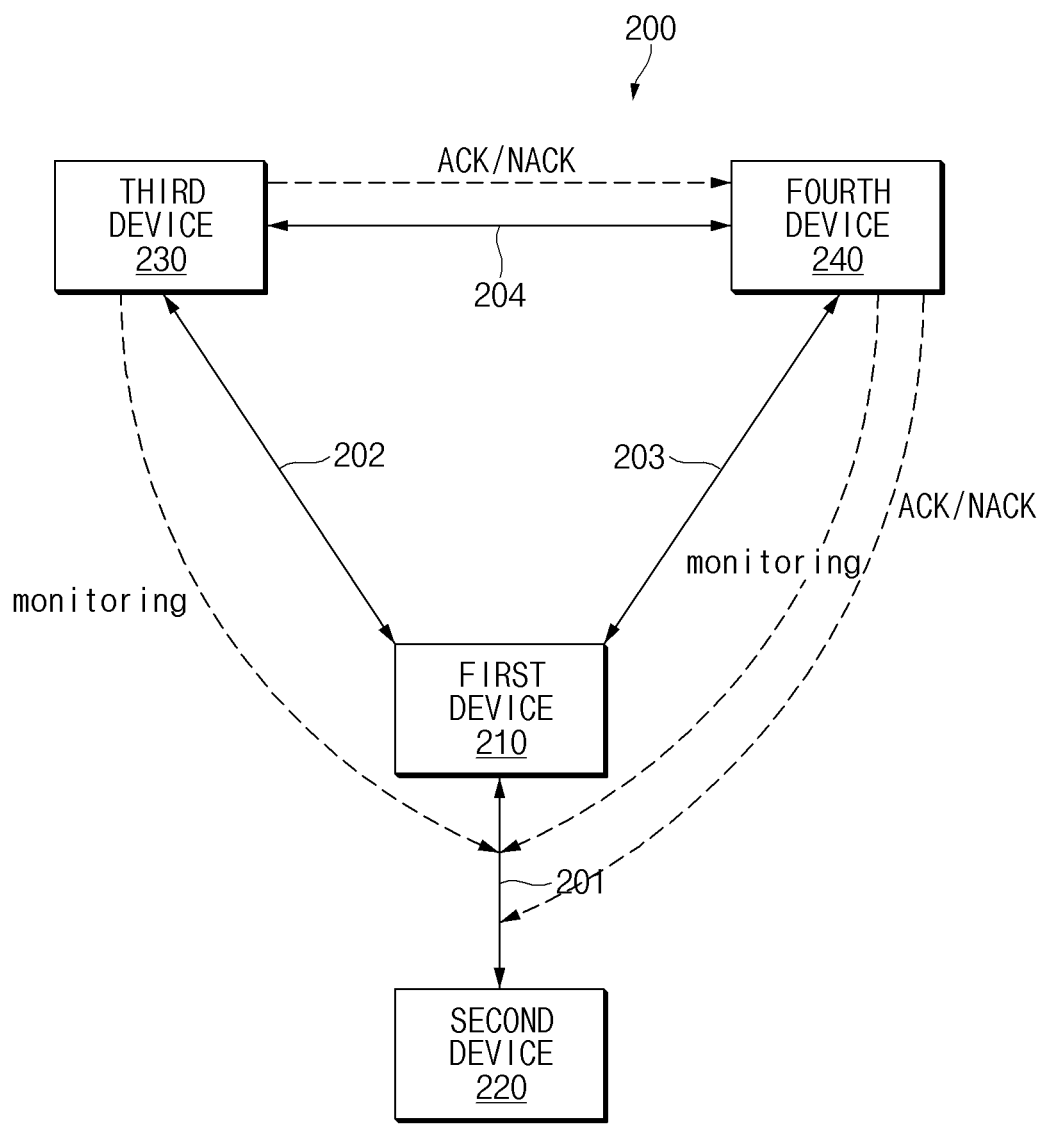
FIG. 2 illustrates a topology of a Bluetooth network environment according to an embodiment.

FIG. 2 illustrates a topology 200 of a Bluetooth network environment according to an embodiment. FIG. 3 is a signal sequence diagram 300 illustrating operations of a plurality of devices in a Bluetooth network environment according to an embodiment.

Referring to FIG. 2, a first device 210, a second device 220, a third device 230, and a fourth device 240 included in the topology 200 may include components, at least some of which are the same as or similar to those of the electronic device 101 shown in FIG. 1, and may perform functions, at least some of which are the same as or similar to those of the electronic device 101. According an embodiment, the first device 210, the second device 220, the third device 230, and the fourth device 240 may perform wireless communication in a short distance over a Bluetooth network defined by the Bluetooth SIG. The Bluetooth network may be, for example, Bluetooth legacy network and Bluetooth low energy (BLE) network. According to an embodiment, the first device 210, the second device 220, the third device 230, and the fourth device 240 may perform wireless communication over one of the Bluetooth legacy network and the BLE network or may perform wireless communication over both of the Bluetooth legacy network and the BLE network.

According an embodiment, the second device 220 may be user equipment, such as a smartphone, a tablet, a desktop computer, or a laptop computer, and the third device 230 and the fourth device 240 may be accessory devices, such as earphones, headsets, speakers, mice, keyboards, or display devices. According an embodiment, the first device 210 may be a case and/or a charger for one or more of the second device 220, the third device 230, and the fourth device 240.

According to an embodiment, each of the third device 230 and the fourth device 240 may previously recognize a counterpart device (e.g., the third device 230 or the fourth device 240) or may previously store information (e.g., address information) of the counterpart device. According an embodiment, when the third device 230 and the fourth device 240 are accessory devices (e.g., earphones) that are paired, they may previously recognize each other or may previously store mutual address information.

According to an embodiment, the second device 220 may serve as the master device, and the first device 210, the third device 230, and/or the fourth device 240 may serve as slave device(s). The number of devices which service as slave devices is not limited to the example shown in FIG. 2. According to an embodiment, the role of the device may be determined in a procedure where a link (e.g., 201, 202, 203, or 204) between devices is established. According to another embodiment, one (e.g., the third device 230) of the third device 230 and the fourth device 240 may serve as the master device, and the other (e.g., the fourth device 240) may serve as the slave device. According to an embodiment, the first device 210 may serve as the master device, and the second device 220, the third device 230, and the fourth device 240 may serve as slave device(s).

The master device may control a physical channel. According an embodiment, the master device may transmit a data packet, whereas the slave device may transmit a data packet to the master device only after receiving the data packet from the master device. According an embodiment, a channel resource (e.g., a frequency hopping channel) for transmitting the data packets may be generated based on a clock of the master device. In the Bluetooth legacy network, a time resource (e.g., a time slot) may be determined based on the clock of the master device. According an embodiment, the time slot may be, for example, 625 microseconds (us). In the BLE network, the master device and the slave device may transmit data packets at specified intervals and may respond after a specified time period (e.g., the inter frame space (T_IFS), about 150 us), when a data packet is received.

Hereinafter, description will be given with regard to a situation where the second device 220 operates as the master device and the other devices (210, 220, and/or 230) operate as slave devices.

According to an embodiment, the second device 220 may transmit a data packet including content such as text, sound, image, or video to other devices 210, 220, and/or 230. According to the type of content included in the data packet, at least one of the other devices 210, 230, and/or 240 as well as the second device 220 may transmit the data packet. According an embodiment, when music is played from the second device 220, only the second device 220 may transmit data packets, whereas, when a call is performed on the second device 220, at least one of the third device 230 and the fourth device 240 as well as the second device 220 may also transmit data packets including content (e.g., voice data). When only the second device 220 transmits data packets, the second device 220 may be referred to as the source device and the first device 210, the third device 230, and/or the fourth device 240 may be referred to as sink device(s).

When the second device 220 establishes a plurality of links with a plurality of other devices (the third device 230 and the fourth device 240) to transmit data packets, because resource consumption, power consumption, and complexity of the links of the second device 220 are able to increase, the second device 220 may establish a first communication link 201 with the first device 210 and may transmit data packets over the first communication link 201. In this case, at least one of the third device 230 and the fourth device 240 may monitor the first communication link 201 to receive data packets including content transmitted over the first communication link 201. In this case, the second device 220 may be referred to as a device under test (DUT), the third device 230 may referred to as a primary earbud or primary equipment (PE), and the fourth device 240 may be referred to as a secondary earbud or secondary equipment (SE).

When a specified condition is met, the first device 210 may enter a Bluetooth paring mode using a first address. The specified condition may be conditions such as when power is supplied to the first device 210, initialization or elapse of a specified time period, or when receiving a user input (e.g., when a user touches with a specific pattern, applies pressure, or pushes a button). According an embodiment, the first device 210 may be equipped with a pressure sensor and may enter the Bluetooth pairing mode depending on a pressure input pattern inputted by the user.

When entering the Bluetooth pairing mode, the first device 210 may allow another electronic device to recognize the first device 210, using wireless communication (e.g., Bluetooth low energy (BLE) communication). When the first device 210 is exposed to a search or scan by another electronic device, the other electronic device may establish a standard Bluetooth communication link with the first device 210. According an embodiment, the first device 210 may generate an advertising signal depending on the specified condition. For example, the first device 210 may output an advertising signal based on when power is supplied, initialization or elapse of a specified time period, or when there is a user input.

According an embodiment, the first device 210 may generate an advertising signal to other peripheral electronic devices via multicast or broadcast. The advertising signal may be a signal for transmitting information associated with a connection, account, or pairing with an unspecified peripheral electronic device (e.g., the second device 220, the third device 230, and/or the fourth device 240), using wireless communication (e.g., BLE communication).

The advertising signal may include information for a connection or pairing between the first device 210 and a peripheral device.

According an embodiment, the advertising signal may include at least one of identification information of the first device 210 (hereinafter, device identification information), account information of the user (hereinafter, user account information), information about whether it is currently paired with another device (hereinafter, current pairing information), a list of previously paired devices (hereinafter, pairing list), information about a device capable of being simultaneously paired (hereinafter, simultaneous paring information), information regarding transmit (tx) power or a sensing area of the first device 210, or information about remaining battery capacity of the first device 210 (hereinafter, battery state information). Furthermore, at least one address of the first device 210 may be included. According an embodiment, the advertising signal may include a first address and a second address of the first device 210. According an embodiment, when there is information about another external electronic device in the first device 210, the advertising signal may include an address of the external electronic device. When there is information about a first address of the fourth device 240 in the first device 210, the advertising signal may include the first address of the fourth device 240. Similarly, when there is information about a first address of the third device 230 in the first device 210, the advertising signal may include the first address of the third device 230.

Figure 3:
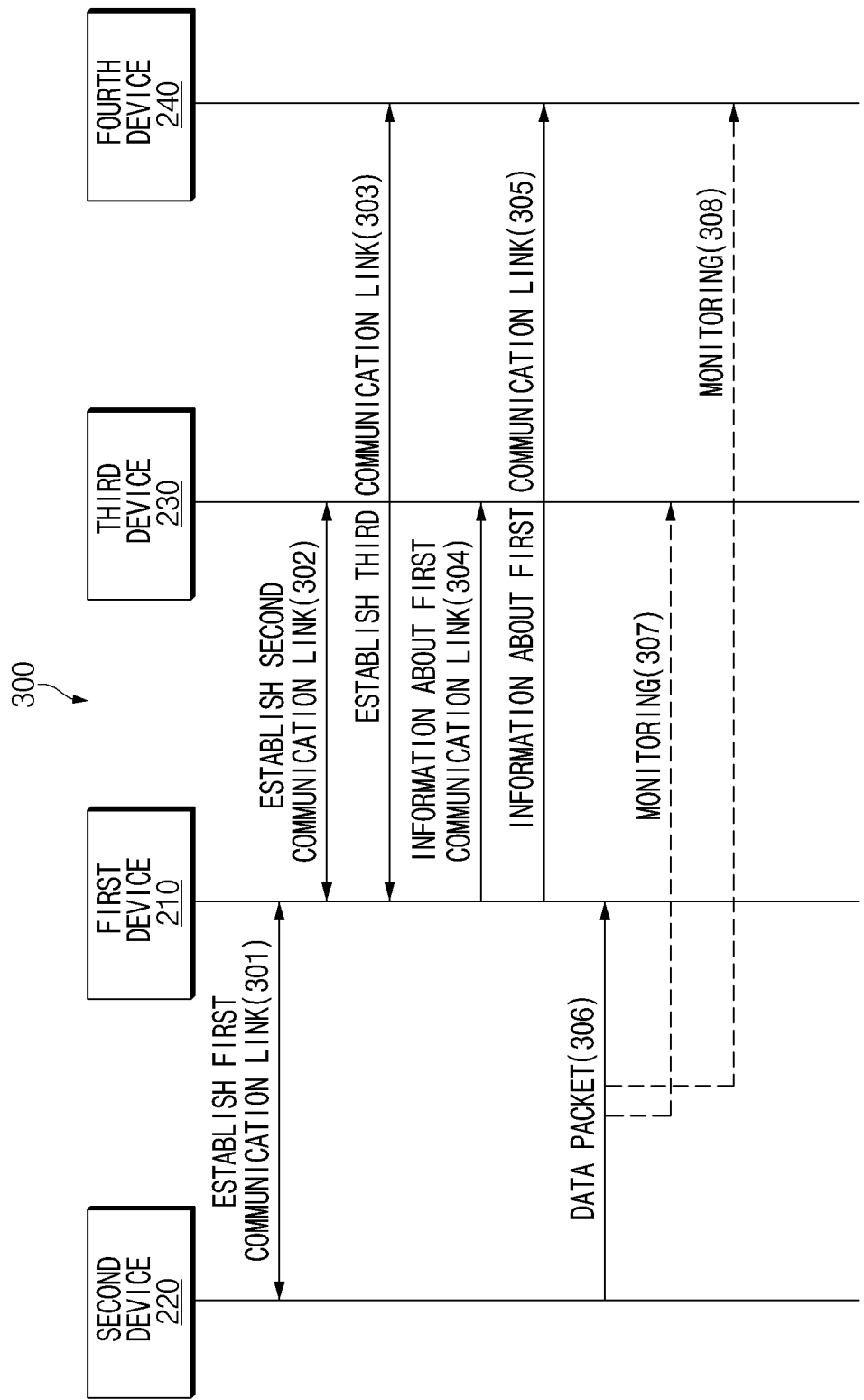
FIG. 3 is a signal sequence diagram illustrating operations of a plurality of devices in a Bluetooth network environment according to an embodiment.

Referring to FIGS. 2 and 3, in operation 301, the first device 210 and the second device 220 may establish the first communication link 201. According an embodiment, the second device 220 may receive an advertising signal of the first device 210 and may request a connection to a first address of the first device 210. The first device 210 may accept it to establish the first communication link 201. For example, the second device 220 may connect the first communication link 201 with the first address of the first device 210.

Alternatively, according to an embodiment, the first device 210 may receive an advertising signal of the second device 220 to obtain information of the second device 220 and may connect the first communication link 201 with the second device 220. The advertising signal of the second device 220 may include information for a connection (or pairing) between the second device 220 and another device.

The first communication link 201 between the second device 220 and the first device 210 may be established in the state where the third device 230 and the fourth device 240 are inserted into the first device 210. For example, when the first device 210 is a charging case and the third device 230 and the fourth device 240 are earphones, the third device 230 and the fourth device 240 may be inserted or disposed within the first device 210.

According to an embodiment, the first device 210 and the second device 220 may be connected with each other through a wired communication interface rather than a Bluetooth connection. For example, the first communication link 201 may be established through serial communication. In this case, the first address of the first device 210 may not be used to establish the first communication link 201, and the first address of the first device 210 may be used to establish another communication link.

The second device 220 may transmit and receive data (e.g., voice data) with the first device 210 by means of a wireless communication protocol (e.g., Bluetooth) over the first communication link 201.

According to an embodiment, the second device 220 and the first device 210 may establish the first communication link 201 based on procedures in Bluetooth standards. For example, the second device 220 and the first device 210 may perform a baseband page procedure for recognizing a counterpart device, a link manager protocol (LMP) procedure for identifying an LMP version, a clock offset, a supported function (e.g., supported feature), a host request/response procedure for identifying a connection, an authentication procedure for identifying whether the counterpart device is a reliable device, an encryption procedure, and a setup complete procedure for notifying the host that the connection (e.g., the first communication link 201) is completed. In operation 302, the first device 210 and the third device 230 may establish a second communication link 202.

According an embodiment, the third device 230 may receive an advertising signal of the first device 210 and may request a connection to a second address of the first device 210. The first device 210 may accept it to establish the second communication link 202. For example, the third device 230 may connect the second communication link 202 with the second address of the first device 210.

Alternatively, according to an embodiment, the first device 210 may receive an advertising signal of the third device 230 to obtain information of the third device 230 and may connect the second communication link 202 with the third device 230. The advertising signal of the third device 230 may include information for a connection (or pairing) between the third device 230 and another device.

According an embodiment, the second communication link 202 between the first device 210 and the third device 230 may be established, when the third device 230 and the fourth device 240 are separated from the first device 210 or in a state where the third device 230 and the fourth device 240 are separated from the first device 210.

According to an embodiment, the first device 210 and the third device 230 may be connected with each other through a wired communication interface rather than a Bluetooth connection. For example, the second communication link 202 may be established through serial communication. In this case, the second address of the first device 210 may not be used to establish the second communication link 202, and the second address of the first device 210 may be used to establish another communication link.

In operation 303, the first device 210 and the fourth device 240 may establish a third communication link 203.

According an embodiment, the fourth device 240 may receive an advertising signal of the first device 210 and may request a connection to the second address of the first device 210. The first device 210 may accept it to establish the third communication link 203. For example, the fourth device 240 may connect the third communication link 203 with the second address of the first device 210.

Alternatively, according to an embodiment, the first device 210 may receive an advertising signal of the fourth device 240 to obtain information of the fourth device 240 and may connect the third communication link 203 with the fourth device 240. The advertising signal of the fourth device 240 may include information for a connection (or pairing) between the fourth device 240 and another device.

According an embodiment, the third communication link 203 between the first device 210 and the fourth device 240 may be established, when the third device 230 and the fourth device 240 are separated from a housing of the first device 210 or in a state where the third device 230 and the fourth device 240 are separated from the housing of the first device 210. According an embodiment, the third communication link 203 between the first device 210 and the fourth device 240 may be established, when the third device 230 and the fourth device 240 are separated from a wired interface of the first device 210 or in a state where the third device 230 and the fourth device 240 are separated from the wired interface of the first device 210.

According to an embodiment, the first device 210 and the fourth device 240 may be connected with each other through a wired communication interface rather than a Bluetooth connection. For example, the third communication link 203 may be established through serial communication. In this case, the second address of the first device 210 may not be used to establish the third communication link 203, and the second address of the first device 210 may be used to establish another communication link.

FIG. 3 illustrates the communication links are established in the order of the second device 220, the third device 230, and the fourth device 240. However, the order in which communication links are connected is not limited to FIG. 3, and may vary.

According to an embodiment, in operation 304, the first device 210 may transmit information about the first communication link 201 to the third device 230 over the second communication link 202. The information associated with the first communication link 201 may include address information (e.g., Bluetooth address of the master device of the first communication link 201, Bluetooth address of the second device 220, and/or Bluetooth address of the first device 210), piconet clock information (e.g., clock native (CLKN) of the master device of the first communication link 201), logical transport (LT) address information (e.g., information assigned by the master device of the first communication link 201), used channel map information, link key information, service discovery protocol (SDP) information (e.g., service and/or profile information associated with the first communication link 201), and/or supported feature information. According an embodiment, the information associated with the first communication link 201 may further include, for example, an extended inquiry response (EIR) packet. The EIR packet may include resource control information of the first communication link 201 and/or information about the manufacturers of the various devices shown.

According an embodiment, the third device 230 may directly deliver the availability of the first communication link 201 by the third device 230 to the second device 220 over the first communication link 201 based on information about the first communication link 201, which includes the first address of the first device 210.

The third device 230 may identify a hopping channel by using information (e.g., information about the first communication link 201) received from the first device 210 and may monitor the first communication link 201 based on it to receive a data packet including content from the second device 220, even though the third device 230 does not have a link with the second device 220. According to an embodiment, when the second device 220 transmits a data packet to the first device 210 over the first communication link 201 in operation 306, in operation 307, the third device 230 may monitor the first communication link 201 based on at least a portion of the information about the first communication link 201 to receive the same data packet as the data packet received by the first device 210. According an embodiment, the third device 230 may operate a radio frequency (RF) reception unit in a time slot transmitted by the second device 220 according to the identified hopping channel and the clock time point to receive the data packet delivered to the first device 210 by the second device 220.

According an embodiment, the third device 230 may operate the RF transmission unit in a time slot received by the second device 220 according to the identified hopping channel and the clock time point based on the information about the first communication link 201 to transmit a packet to the second device 220. According to an embodiment, the third device 230 may include a voice input system (e.g., microphone). When receiving sound (e.g. a user's voice) via the voice input system, the third device 230 may transmit a voice data packet to the second device 220 over the first communication link 201 based on the information about the first communication link 201.

According to an embodiment, in operation 305, the first device 210 may transmit the information about the first communication link 201 to the fourth device 240 over the third communication link 203. According an embodiment, the fourth device 240 may directly deliver the availability of the first communication link 201 by the fourth device 240 to the second device 220 over the first communication link 201 based on the information about the first communication link 201, which includes the first address of the first device 210.

Like the third device 230, the fourth device 240 may receive a data packet including content from the second device 220 over the first communication link 201 based on the information (e.g., the information about the first communication link 201) received from the first device 210, even though the fourth device 240 does not have a link with the second device 220. According to an embodiment, when the second device 220 transits a data packet to the first device 210 over the first communication link 201 in operation 306, in operation 308, the fourth device 240 may monitor the first communication link 201 based on at least a portion of the information about the first communication link 201 to receive the same data packet as the data packet received by the first device 210. Operation 307 and/or operation 308 may be referred to as shadowing or snooping.

According to an embodiment, when the fourth device 240 may include a voice input system (e.g., microphone). When receiving sound (e.g. a user's voice) via the voice input system, the fourth device 240 may transmit a voice data packet to the second device 220 over the first communication link 201 based on the information about the first communication link 201.

Although not illustrated in FIG. 3, according to another embodiment, when the first device 210, the third device 230, and the fourth device 240 are devices supporting the same user account or related user accounts (e.g., family accounts), they may share the information associated with the first communication link 201 through an external device (not shown) interworking with the first device 210, the third device 230, or the fourth device 240 through the same or related user account. In this case, the topology 200 may further include the external server (not shown). According an embodiment, the first device 210 may transmit the information associated with the first communication link 201 to the external server (not shown), and the external server (not shown) may transmit the information associated with the first communication link 201 to the third device 230 and the fourth device 240.

According to an embodiment, when the fourth communication link 204 is connected between the third device 230 and the fourth device 240, when the third device 230 receives the information about the first communication link 201 over the second communication link 202 from the first device 210, the third device 230 may transmit the information about the first communication link 201 to the fourth device 240 over the fourth communication link 204. According to an embodiment, when the fourth communication link 204. Similarly, when the fourth device 240 receives the information about the first communication link 201 over the third communication link 203 from the first device 210, the fourth device 240 may transmit the information about the first communication link 201 to the third device 230 over the fourth communication link 204. According to an embodiment, when the fourth communication link 204 is connected between the third device 230 and the fourth device 240, the third device 230 may deliver a response message (e.g., ACK or NACK) of the third device 230 to the fourth device 240 over the fourth communication link 204. The fourth device 240 may take into account both reception information of the third device 230 and reception information of the fourth device 240 to transmit a response message (e.g., ACK or NACK) to the second device 220 over the first communication link 201. According to an embodiment, the fourth device 240 may deliver reception information of the fourth device 240 to the third device 230 over the fourth communication link 204, and the third device 230 may take into account both the reception information of the fourth device 240 and the reception information of the third device 230 to transmit a response message (ACK or NACK) to the second device 220 over the first communication link 201. The transmission of the reception information will be described below with reference to FIGS. 4 and 5.

Hereinafter, operations of a plurality of devices according to an embodiment will be described with reference to FIGS. 2, 4, and 5. The same configurations as the embodiment described above may be referred to using the same reference numerals, and description of the same configurations as the embodiment described above may be omitted.

Figure 4:
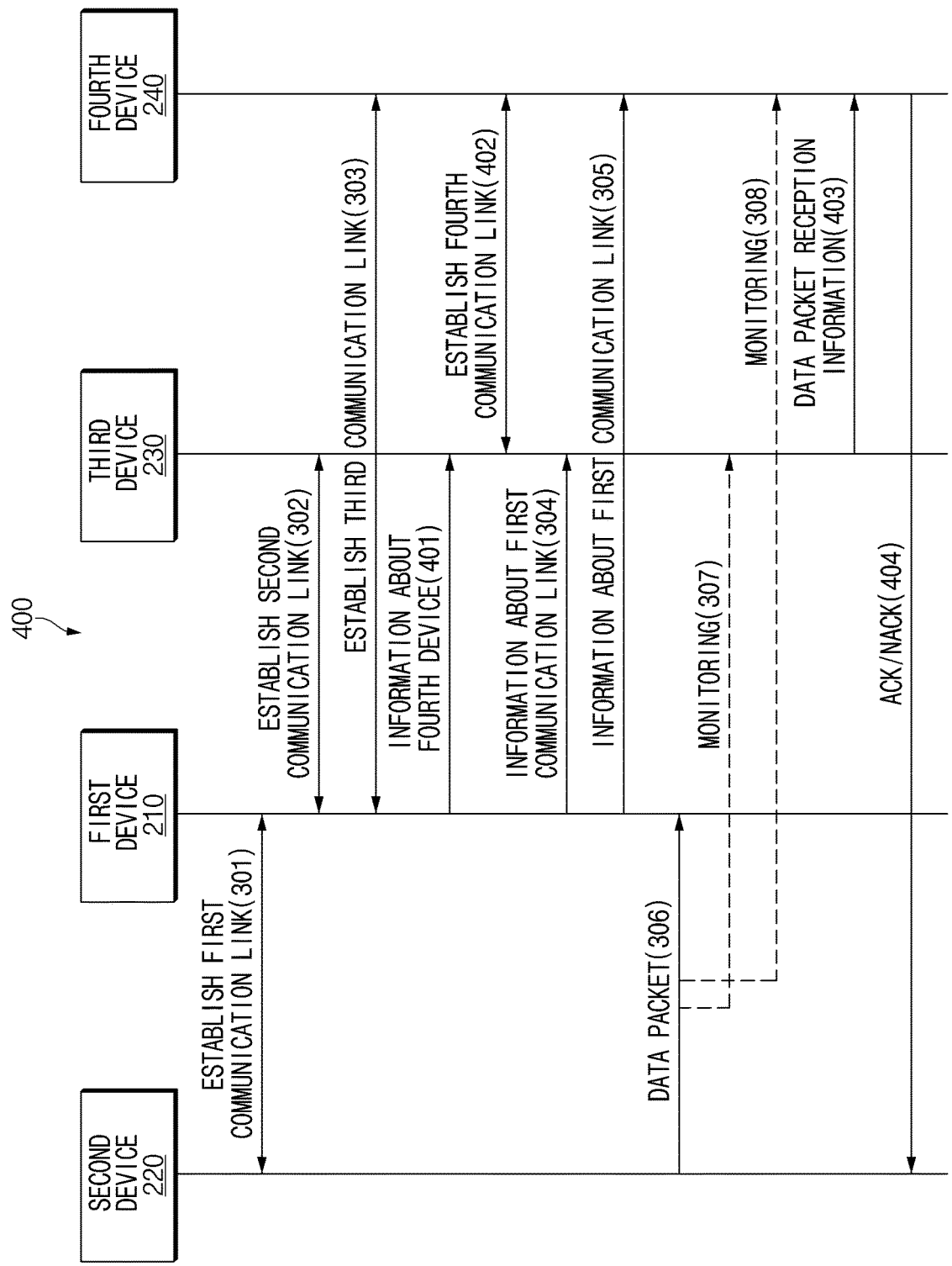
FIG. 4 is a signal sequence diagram illustrating operations of a plurality of devices in a Bluetooth network environment according to an embodiment.

FIG. 4 is a signal sequence diagram 400 illustrating operations of a plurality of devices in a Bluetooth network environment according to an embodiment. FIG. 5 is a drawing 500 illustrating an operation of transmitting response messages of a plurality of devices in a Bluetooth network environment according to an embodiment. The order of the plurality of operations shown in the signal sequence diagram 400 of FIG. 4 is not limiting, and example the order of the communication link establishment operation and the data transmission operation may be changed. However, the operation of transmitting data over a communication link may occur only after the establishment of the corresponding communication link (e.g., first to fourth communication links 201 to 204).

Referring to FIGS. 2 and 4, according to an embodiment, in operation 401, the first device 210 may transmit information of the fourth device 240 to the third device 230 over the second communication link 202. According to an embodiment, the information of the fourth device 240 may be the Bluetooth address of the fourth device 240. The information of the fourth device 240 may be transmitted together with information about the first communication link 201 when the first device 210 transmits information about the first communication link 201 to the third device 230 over the second communication link 202. The third device 230 may identify and connect with the fourth device 240, which is then paired with the third device 230, based on the information about the fourth device 240. Alternatively, according to an embodiment, the first device 210 may transmit information of the third device 230 to the fourth device 240 over the third communication link 203. Alternatively, according to an embodiment, information about the device which is to be paired with the third device 230 and/or the fourth device 240 may be stored.

The third device 230 may establish the fourth communication link 204 using the first address of the fourth device 240 and the first address of the third device 230, where the first address of the fourth device 240 is a portion of the information about the fourth device 240. According to an embodiment, the third device 230 may receive the first address of the fourth device 240 from the first device 210 over the second communication link 202 and may request a connection to the first address of the fourth device 240 to establish the fourth communication link 204.

FIG. 4 illustrates that the third device 230 receives the information about the fourth device 240. However, according to an embodiment, the fourth device 240 may receive information about the third device 230 from the first device 210 over the third communication link 203. In this case, the fourth device 240 may request a connection to the first address of the third device 230 to establish the fourth communication link 204.

Furthermore, FIG. 4 separately illustrates operation 401 where the first device 210 transmits the information about the fourth device 240 to the third device 230 and operation 304 where the first device 210 transmits the information about the first communication link 201 to the third device 230. However, when the first device 210 first establishes the first communication link 201 with the second device 220, it may transmit two pieces of information (e.g., the information about the fourth device 240 and the information about the first communication link 201) together to the third device 230.

Furthermore, FIG. 4 illustrates that the fourth communication link 204 is established earlier than the first communication link 201. However, according another embodiment, the fourth communication link 204 between the third device 230 and the fourth device 240 may be established after establishment of the first communication link 201 between the second device 220 and the first device 210.

The third device 230 may share various pieces of information including state information of the third device 230 and state information of the fourth device 240 over the fourth communication link 204. According an embodiment, the third device 230 may retransmit a packet, first transmitted from the second device 220, to the fourth device 240.

Figure 5:
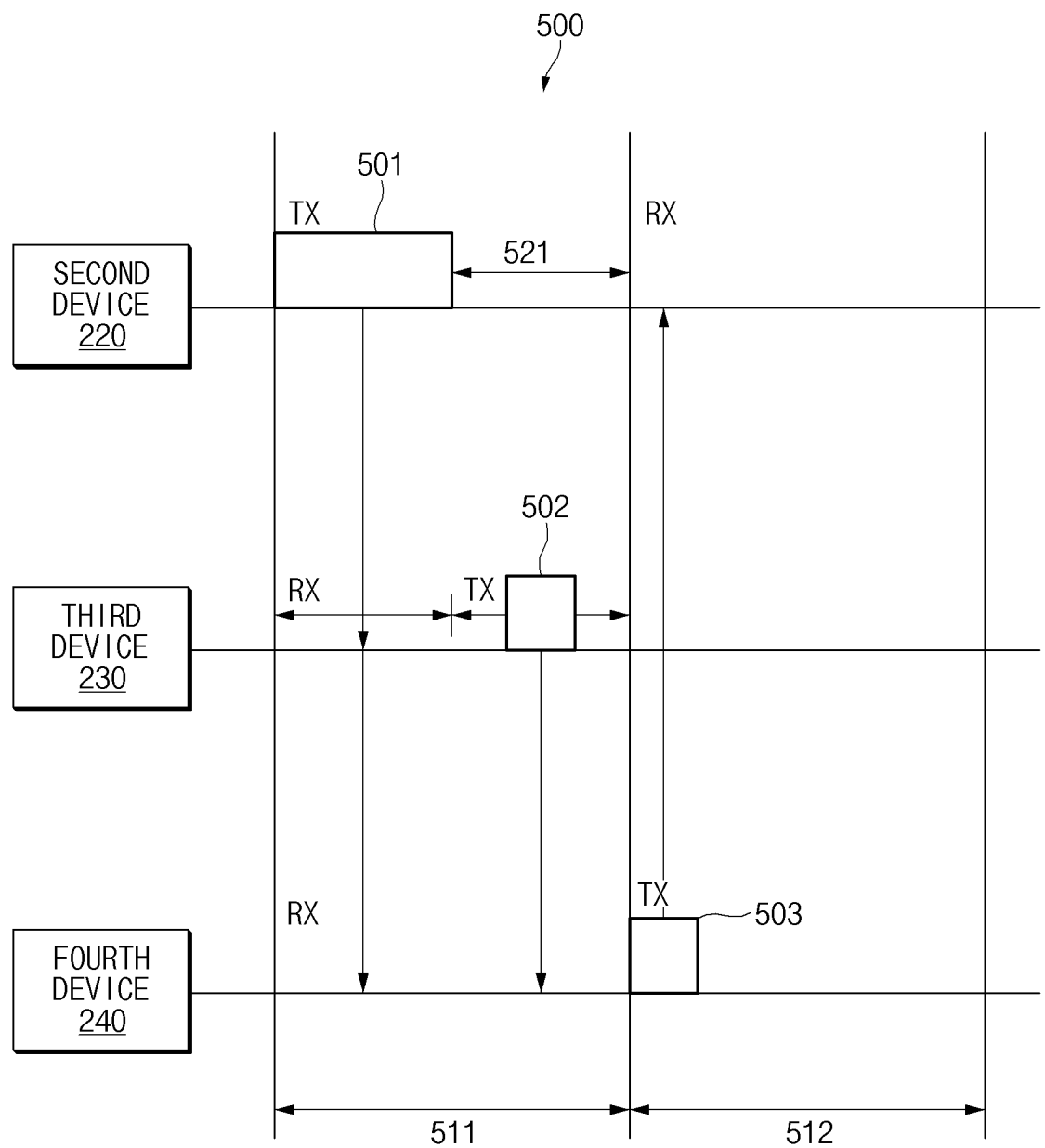
FIG. 5 is a drawing illustrating an operation of transmitting response messages of a plurality of devices in a Bluetooth network environment according to an embodiment.

Referring to FIGS. 2, 4, and 5, in operation 306, the second device 220 may transmit a data packet 501 to the first device 210 over the first communication link 201. In operation 307, the third device 230 may monitor the first communication link 201 to receive the data packet 501. In operation 308, the fourth device 240 may monitor the first communication link 201 to receive the data packet 501.

In operation 403, the third device 230 may transmit reception information 502 of the third device, which is about the received data packet 501, to the fourth device 240. When normally or successfully receiving the data packet 501, the third device 230 may transmit a positive acknowledgement (ACK) as the reception information 502 of the third device. When the data packet 501 is not normally received (or when the received data is not normally processed), the third device 230 may transmit a negative acknowledgement (NACK) message as the reception information 502 of the third device. In certain embodiments of the disclosure, when the data packet is normally received, the data is successfully processed (e.g., decoded or parsed) after being successfully received by the corresponding device.

According to an embodiment, a scheme that the third device 230 delivers the reception information 502 to the fourth device 240 may follow a scheme stored in the third device 230 or may be determined when the fourth communication link 204 is established between the third device 230 and the fourth device 240. According an embodiment, the third device 230 may deliver the reception information 502 to the fourth device 240 via at least one of the fourth communication link 204 (wired or wireless), broadcasting, non-audible tone, a unidirectional wireless link, a skin vibration pattern (vibration patterns transmitted through skin), or a light signal pattern.

To deliver a response message 503 to the second device 220 in a time slot subsequent to a time slot 511 where the data packet 501 is received from the second device 220, the fourth device 240 may calculate a remaining time 521 of the time slot 511 (e.g., 625 µs) depending on a packet type of the data packet 501 (e.g., 426 µs or less). The fourth device 240 may receive the reception information 502 of the third device from the third device 230 during the corresponding remaining time 521 (e.g., 625 µs-426 µs or less=199 µs or more).

Because the fourth device 240 includes an RF reception unit which operates to receive the data packet 501 delivered over the first communication link 201 from the second device 220 and receives (or monitors) a data packet transmitted from the second device 220 to the first device 210 over the first communication link 201, the third device 230 may use the first address of the first device 210 and may broadcast a packet including the reception information 502 of the third device such that the fourth device 240 receives it.

For example, a packet configuration may be an ID packet defined in Bluetooth specifications. The ID packet may not separately include ID packet data and may include a sync word including an address of a target device.

In operation 404, the fourth device 240 may take into account both the reception information 502 of the third device 230 and reception information about the data packet 501 of the fourth device 240 and may deliver a response message 503 to the second device 220.

According an embodiment, when the fourth device 240 receives the reception information 502 of the third device indicating ACK from the third device 230 and normally receives the data packet 501, it may transmit the response message 503 indicating ACK to the second device 220. According an embodiment, when the fourth device 240 receives the reception information 502 of the third device indicating ACK from the third device 230 and does not normally receive the data packet 501, it may transmit a response message indicating NACK as the response message 503 to the second device 220 or may not transmit the response message 503 to the second device 220.

According to an embodiment, when the fourth device 240 does not receive the reception information 502 of the third device within a specified time period (e.g., the remaining time 521) from the third device 230 or receives the reception information 502 of the third device indicating NACK from the third device 230, irrespective of whether the fourth device 240 normally receives the data packet 501, it may transmit a response message indicating NACK as the response message 503 to the second device 220 or may not transmit the response message 503 to the second device 220.

The fourth device 240 may transmit the response message 503 without being directly connected with the second device 220. According to an embodiment, the fourth device 240 may transmit the response message 503 based on the first address of the first device 210 and/or information about the first communication link 201. According to an embodiment, in operation 404, the fourth device 240 may operate an RF transmission unit to employ a hopping channel and a clock time point based on the first address of the first device 210 and/or the information about the first communication link 201 to deliver the response message 503 to the second device 220.

According to an embodiment, ACK or NACK may be represented as one-bit information in the response message 503. When an ACK message is received after transmitting the data packet 501, the second device 220 may transmit the next data packet. When a NACK message is received or when the response message 503 is not received within a specified time period, the second device 220 may retransmit the same data packet (e.g., the data packet 501) in a time slot (not shown) subsequent to the time slot 512.

FIGS. 4 and 5 illustrate that the third device 230 transmits the reception information 502 of the third device to the fourth device 240 and that the fourth device transmits the response message 503 formed by synthesizing the reception information 502 of the third device with reception information of the fourth device to the second device 220. However, the disclosure is not limited thereto. The fourth device 240 may transmit the reception information (ACK or NACK) of the fourth device to the third device 230. The third device 230 may transmit a response message formed by synthesizing the reception information of the fourth device 240 with reception information of the third device 230 to the second device 220. The method where the fourth device 240 forms and transmits the reception information of the fourth device 240 and the method where the third device 230 forms a response message by synthesizing the reception information of the fourth device 240 with the reception information of the third device 230 and transmits the response message to the second device 220 may be performed in the same manner as the method where the third device 230 forms and transmits the reception information of the third device 230 and a method where the fourth device 240 forms a response message by synthesizing the reception information of the third device 230 with the response message of the fourth device 240 and transmits the response message to the second device 220.

Furthermore, according to an embodiment, when transmitting data by using a plurality of time slots (e.g., three time slots), the second device 220 may receive a response message from the third device 230 or the fourth device 240 in the remaining time of a last time slot (e.g., a third time slot).

Furthermore, according to an embodiment, the third device 230 and the fourth device 240 do not monitor the first communication link 201. The third device 230 or the fourth device 240 may operate a separate communication link with the first device 210 using address information received from the first device 210, and the first device 210 may not use its first address for establishing the first communication link 201 in that case.

Hereinafter, operations of a plurality of devices according to an embodiment will be described with reference to FIGS. 6 and 7. The same configurations as the embodiment described above may be referred to using the same reference numerals, and description of the same configurations as the embodiment described above may be omitted.

Figure 6:
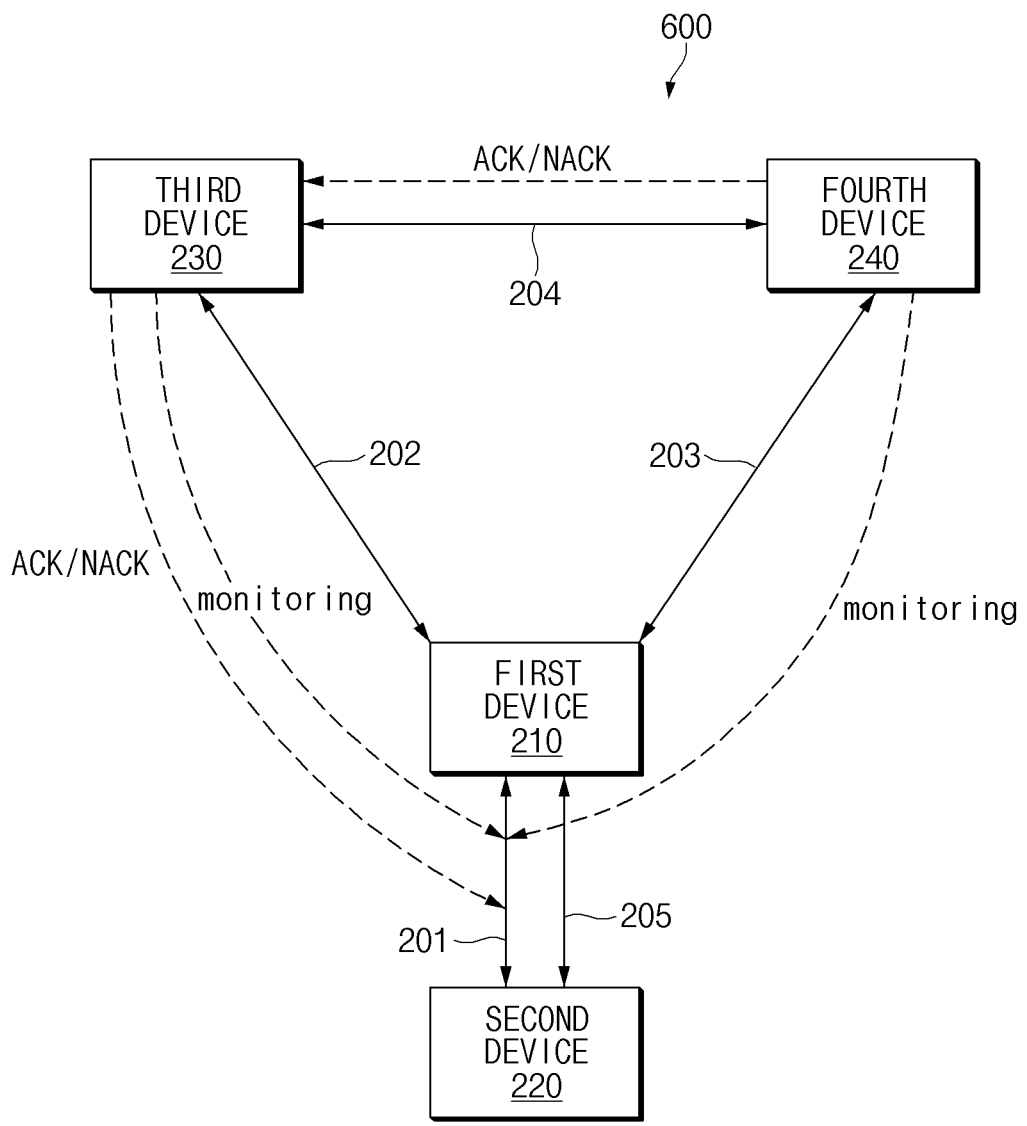
FIG. 6 illustrates a topology of a Bluetooth network environment according to an embodiment.

FIG. 6 illustrates a topology 600 of a Bluetooth network environment according to an embodiment. FIG. 7 is a signal sequence diagram 700 illustrating operations of a plurality of devices in a Bluetooth network environment according to an embodiment. The order of the plurality of operations shown in the signal sequence diagram 700 of FIG. 7 is not limiting, and for example the order of the communication link establishment operation and the data transmission operation may be changed. However, the operation of transmitting data through a communication link may occur only after the corresponding communication link (e.g., first to fifth communication links 201 to 205) is established.

Figure 7:
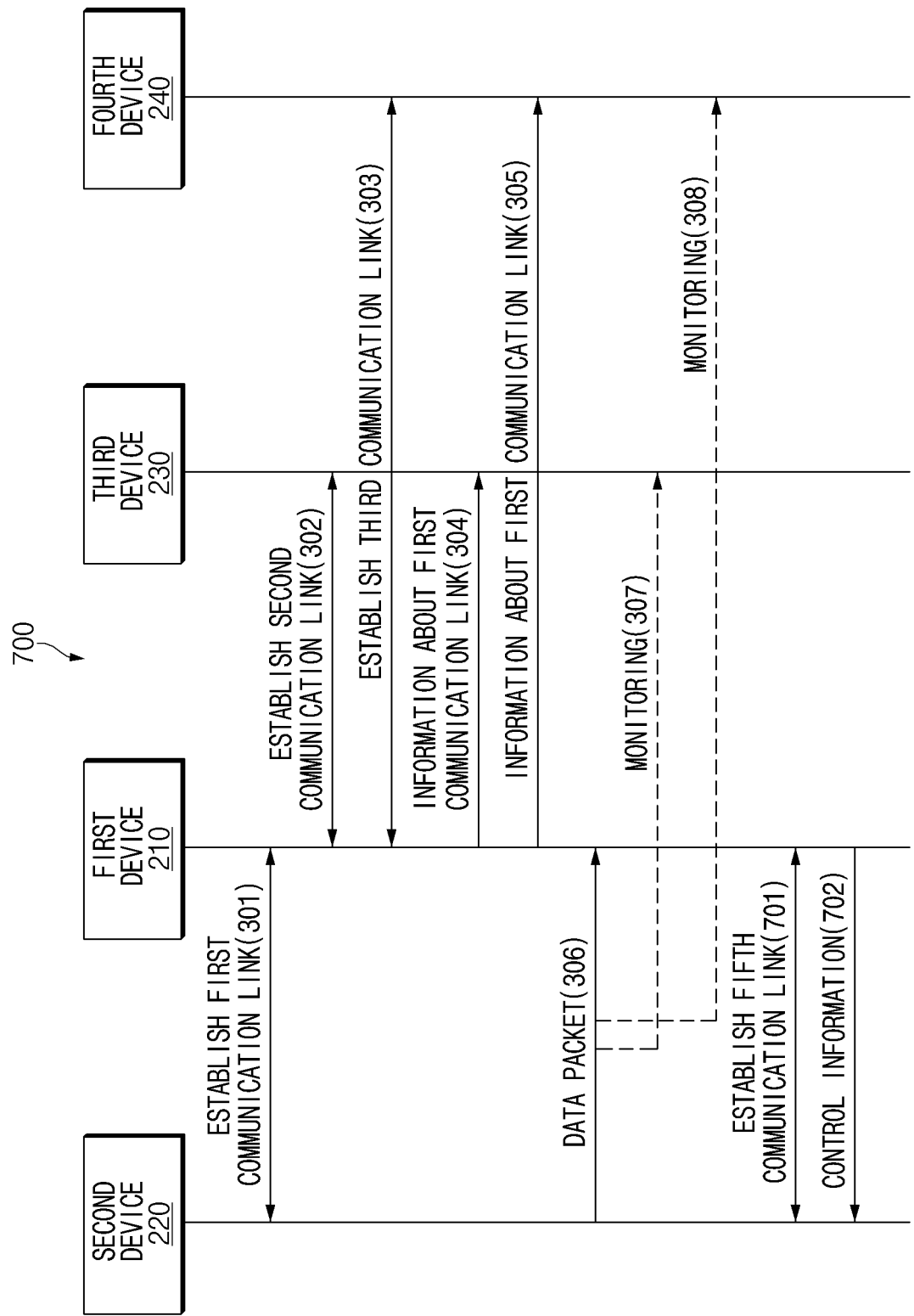
FIG. 7 is a signal sequence diagram illustrating operations of a plurality of devices in a Bluetooth network environment according to an embodiment.

Referring to FIGS. 6 and 7, in operation 301, the first device 210 and the second device 220 may establish the first communication link 201 using the first address of the first device 210. In operation 302, the first device 210 and the third device 230 may establish a second communication link 202 using the second address of the first device 210. In operation 303, the first device 210 and the fourth device 240 may establish a third communication link 203 using the second address of the first device 210.

According an embodiment, in operation 304, the first device 210 may deliver information about the first communication link 201 and the first address of the first device 210 to the third device 230 over the second communication link 202 established using the second address.

According an embodiment, in operation 305, the first device 210 may deliver the information about the first communication link 201 and the first address of the first device 210 to the fourth device 240 over the third communication link 203 established using the second address.

According to an embodiment, in operation 306, the second device 220 may transmit a data packet (e.g., data packet 501 of FIG. 5) to the first device 210 over the first communication link 201. In operation 307, the third device 230 may monitor the first communication link 201 to receive the data packet 501. In operation 308, the fourth device 240 may monitor the first communication link 201 to receive the data packet 501.

According an embodiment, in operation 701, the first device 210 may connect the fifth communication link 205 with the second device 220 using the second address or the third address of the first device 210. The timing of the operation 701 of connecting the fifth communication link 205 with the first device 210 and the second device 220 using the second address or the third address of the first device 210 is not limited to the illustration of FIG. 7.

According to an embodiment, when the first device 210 delivers the information about the first communication link 201 and the first address of the first device 210 to the third device 230 over the second communication link 202 established using the second address and delivers the information about the first communication link 201 and the first address of the first device 210 to the fourth device 240 over the third communication link 203 established using the second address in operations 304 and 305, the first device 210 may allow the third device 230 and the fourth device 240 to use the first address of the first device 210 and the first communication link 201. After the first device 210 may not use the first address of the first device 210 and the first communication link 201, and instead may operate using the second address or the third address of the first device 210. Operating using the second address or the third address of the first device 210 may mean that the first device 210 and the second device 220 establish the fifth communication link 205 or communicates with each other over the fifth communication link 205.

According to an embodiment, after the first device 210 delivers the first address of the first device 210 and the information about the first communication link 201 to the third device 230 and the fourth device 240 in operations 304 and 305 described above, when the first device 210 receives information that the third device 230 starts to use the first communication link 201 using the first address of the first device 210 and/or when the first device 210 receives information that the fourth device 240 starts to use the first communication link 201 using the first address of the first device 210, the first device 210 may operate using the second address or the third address of the first device 210, and may cease using the first address of the first device 210 and the first communication link 201.

According to an embodiment, after delivering the first address of the first device 210 and the information about the first communication link 201 to the third device 230 and the fourth device 240 in operations 304 and 305 described above, the first device 210 may identify that the third device 230 and the fourth device 240 are separated from the first device 210 (e.g., the housing of the first device 210) by using a wired interface and may operate using the second address or the third address of the first device 210, and may cease using the first address of the first device 210 and the first communication link 201.

According to an embodiment, the first device 210 may identify that the third device 230 and the fourth device 240 are inserted into the first device 210 (e.g., the housing of the first device 210) by using the wired interface and may operate the second address or the third address of the first device 210, and may cease using the first address of the first device 210 and the first communication link 201. For example, the first device 210 may transmit control information to the second device 220 over the fifth communication link 205 which uses the second address or the third address of the first device 210 and may control a speaker of the second device 220. Furthermore, for example, the second device 220 may transmit control information to the first device 210 over the fifth communication link 205 which uses the second address or the third address of the first device 210 and may control a speaker of the first device 210.

According to an embodiment, the first device 210 may request a Bluetooth connection from the second device 220 to the second address or the third address of the first device 210. When the second device 220 accepts the Bluetooth connection, the first device 210 may connect the fifth communication link 205 with the second device 220 using the second address or the third address of the first device 210.

According to an embodiment, when transmitting an advertising signal including the first address of the first device 210 in the Bluetooth pairing mode, the first device 210 may include and transmit the second address or the third address of the first device 210 in the advertising signal. According an embodiment, when receiving the advertising signal, the second device 220 may request a Bluetooth connection to the second address or the third address of the first device 210. According an embodiment, when the first device 210 and/or the second device 220 establishes the first communication link 201 with the second device 220 using the first address of the first device 210, the first device 210 and/or the second device 220 may receive a response about whether to establish the fifth communication link 205 with the second device 220 using the second address or the third address of the first device 210 (e.g., the second device 220 may provide a user with an indication such as a check box and may receive a user input), and the corresponding response information may be stored in the first device 210 and/or the second device 220. When there is a request for a Bluetooth connection to the second address or the third address of the first device 210 and/or the second device 220, the first device 210 and/or the second device 220 may establish the fifth communication link 205 using the second address or the third address of the first device 210 without separate user input.

According to an embodiment, after receiving information that the third device 230 and the fourth device 240 have started to use the first communication link 201, the second device 220 may request a Bluetooth connection from the first device 210 based on an advertising signal including the third address of the first device 210. For example, when the third device 230 and/or the fourth device 240 deliver(s) information that the third device 230 and/or the fourth device 240 have started to use the first communication link 201 over the first communication link 201, the second device 220 may know that the third device 230 and the fourth device 240 have started to use the first communication link 201. In another example, when the first device 210 receives information that the third device 230 and/or the fourth device 240 have started to use the first communication link 201 from the third device 230 and/or the fourth device 240 and delivers it to the second device 220 again over the first communication link 201, the second device 220 may know that the third device 230 and the fourth device 240 have started to use the first communication link 201. The first device 210 may accept the Bluetooth connection of the second device 220 and may establish the fifth communication link 205 with the second device 220 using the third address of the first device 210.

According to an embodiment, the first device 210 may transmit a second advertising signal including the third address of the first device 210, independently of the first advertising signal including the first address and/or the second address of the first device 210. The second device 220 may receive the second advertising packet to recognize the third address of the first device 210. The second device 220 may request a Bluetooth connection to the third address of the first device 210. The first device 210 may accept it and may establish the fifth communication link 205 with the second device 220 using the third address of the first device 210.

According an embodiment, the first device 210 may request a Bluetooth connection from the second device 220 to the third address of the first device 210 using the Bluetooth address of the second device 220, which is recognized while creating the first communication link 201. When the second device 220 accepts it, the fifth communication link 205 may be established.

The first device 210 may perform an operation based on standard Bluetooth communication with the second device 220 over the connected fifth communication link 205. For example, the first device 210 may connect various profiles based on Bluetooth specifications over the fifth communication link 205 and may communicate with the second device 220 based on the profiles.

According an embodiment, in operation 702, the first device 210 may deliver control information to the second device 220 over the fifth communication link 205.

For example, in operation 702, the first device 210 may deliver control information, such as music playback, stop, next/previous song, volume up/down, one-song repetition, full repetition, or random playback, which is associated with a music playback application, to the second device 220 through an audio/video remote control profile (AVRCP) profile connection based on the fifth communication link 205.

For another example, in operation 702, the first device 210 may deliver control information, such as call origination, call acceptance, reception denial, volume up/down, speech recognition, start/stop, record, or speaker phone operation, which is associated with a call application, to the second device 220 through a hands-free profile (HFP) connection based on the fifth communication link 205. According to an embodiment, the first device 210 may include a voice input/output device (e.g., microphone and/or speaker) and may make phone calls using it.

In another example, the first device 210 may play audio data delivered from the second device 220 using a sound output device (e.g., speaker) of the first device 210 through an advanced audio distribution profile (A2DP) connection based on the fifth communication link 205.

According an embodiment, the first device 210 may include a pressure sensor and may deliver events identified according to a pattern where a user holds the first device 210 to the second device 220 over the fifth communication link 205.

Figure 8:
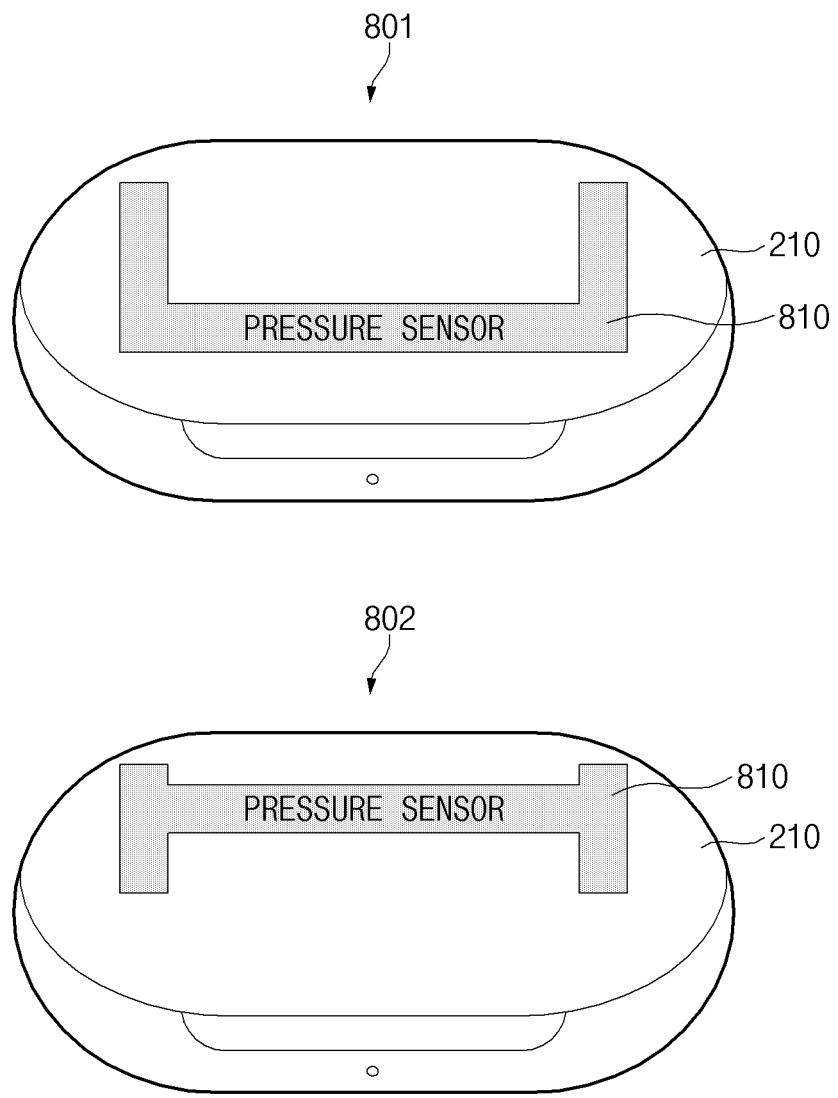
FIG. 8 is a drawing illustrating examples of mounting a pressure sensor of an electronic device according to certain embodiments.
Figure 9:
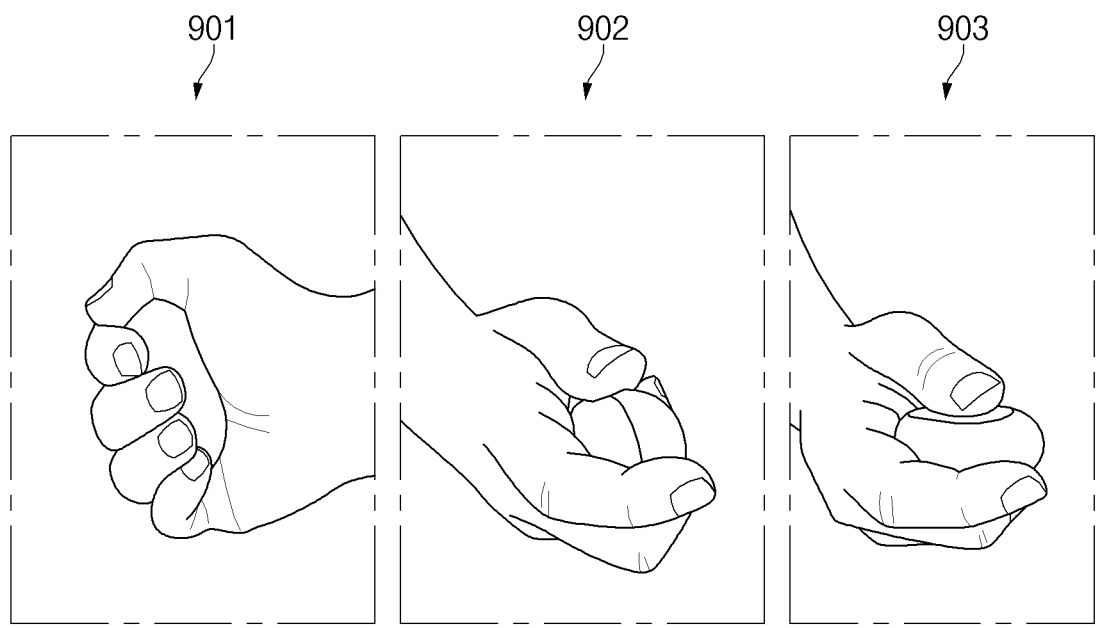
FIG. 9 is a diagram illustrating examples of a grip pattern of an electronic device according to an embodiment.

FIG. 8 is a drawing illustrating examples 801 and 802 of a pressure sensor of an electronic device according to certain embodiments. FIG. 9 is a diagram illustrating examples 901, 902, and 903 of a grip pattern of an electronic device according to an embodiment.

Referring to FIGS. 6, 8, and 9, the pressure sensor 810 may be attached and mounted on the first device 210. The pressure sensor may be mounted on the electronic device to detect various grip patterns of the user gripping the first device 210.

A sensor such as a piezoelectric sensor with the property where electricity occurs on the surface of a crystal (e.g., quartz, or tourmaline) when pressure is applied in a specific direction may be used as the pressure sensor 810, and the pressure sensor 810 may be mounted on an upper center part or a back part of the first device 210. According to another embodiment, the pressure sensor may be located along the periphery of the first device.

According to an embodiment, the first device 210 may detect a position where the user applies pressure, force where the user applies pressure, the number of times that the user applies pressure, and/or the time period when the user applies pressure and may generate various signals depending on a combination thereof. Such a signal may be a control signal defined in a Bluetooth profile and may be a newly defined control signal. Operation 901 of FIG. 9 may correspond to the operation of gripping the first device 210. Operation 902 may correspond to the operation of applying pressure to the side part of the first device 210. Operation 903 may correspond to the operation of applying pressure to the upper center part of the first device 210. According to an embodiment, when receiving the operation of strongly gripping the first device 210 (e.g., operation 901), the first device 210 may form and deliver a command associated with executing music playback to the second device 220. When receiving the operation of lightly holding the first device 210, the first device 210 may deliver a music stop/play command to the second device 220. According to an embodiment, when receiving the operation of lightly holding the first device 210 twice in succession, the first device 210 may deliver a command to move to a next song to the second device 220. Furthermore, according to an embodiment, when receiving the operation of swiping down or up the first device 210, the first device 210 may deliver a volume up/down command to the second device 220. According to another embodiment, when a call is received during music playback, the first device 210 may deliver a command to receive the call when receiving the operation of strongly gripping the first device 210.

Figure 10:
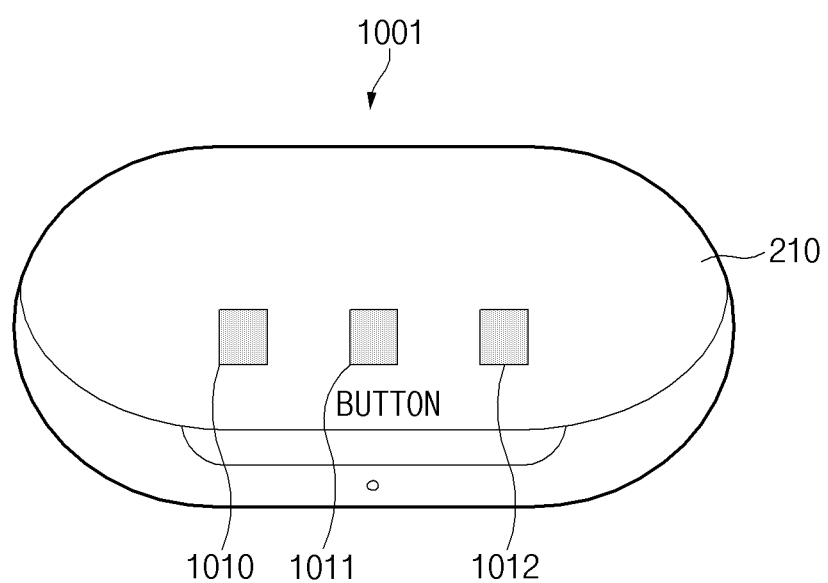
FIG. 10 is a drawing illustrating an example where one or more buttons are included in an electronic device according to an embodiment.

FIG. 10 is a drawing illustrating an example 1001 where one or more buttons are included in an electronic device according to an embodiment.

Referring to FIGS. 6 and 10, according another embodiment, at least one or more buttons 1010, 1011, or 1012 may be mounted on the first device 210. Various signals may be delivered to the second device 220 over the fifth communication link 205 according to inputs from the user to the one or more buttons 1010, 1011, or 1012. According an embodiment, various input patterns to one or more buttons 1010, 1011, or 1012 may be mapped to various control operations such as music playback/stop, next song playback, previous song playback, call acceptance, call rejection, volume up, or volume down. According an embodiment, the control operation (e.g., music playback/stop, next song playback, previous song playback, call acceptance, call rejection, volume up, volume down, or the like) corresponding to the various input patterns to one or more buttons 1010, 1011, or 1012 may be set by the user. The first device 210 may deliver information used to process the identified control operation in the second device 220, such that the second device 220 performs the intended operation.

Hereinafter, a user interface of the device according to an embodiment will be described with reference to FIGS. 2 and 11. The same configurations as the embodiment described above may be referred to using the same reference numerals, and description of the same configurations as the embodiment described above may be omitted.

Figure 11:
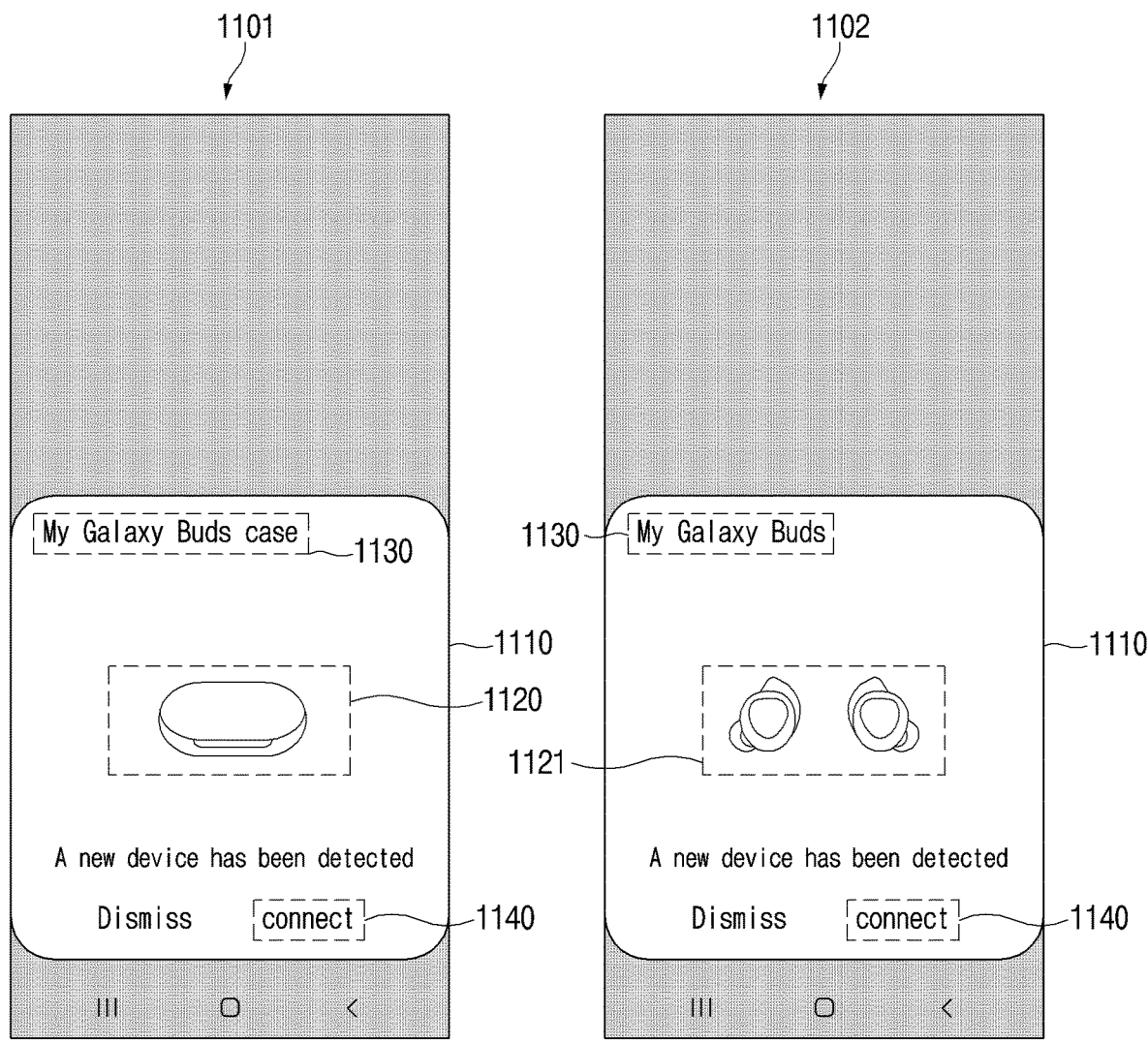
FIG. 11 illustrates examples of a user interface (UI) indicating a connection between devices in a Bluetooth network environment according to an embodiment.

FIG. 11 illustrates examples 1101 and 1102 of a user interface (UI) indicating a connection between devices in a Bluetooth network environment according to an embodiment.

Referring to FIGS. 2 and 11, when entering a Bluetooth pairing mode, the first device 210 may generate an advertising signal based on a specified condition. The peripheral second device 220 may recognize the first device 210 by receiving the advertising signal and may output a user interface 1110 for a connection with the first device 210 on a display device (e.g., display device 160 of FIG. 1). The second device 220 may output the user interface 1110 on the display device included in the second device 220 depending on various conditions based on information included in the advertising signal. According to an embodiment, the user interface 1110 may include an image 1120 corresponding to the first device 210.

The user interface 1110 may include device recognition information. According to an embodiment, the device recognition information may include at least one of an image 1120 or 1121 indicating the shape of the device which is the Bluetooth connection target and text 1130 indicating the name of the device which is the Bluetooth connection target. According an embodiment, although not illustrated in FIG. 11, the user interface 1110 may indicate whether there is a history where the device which is the Bluetooth connection target is previously connected.

According an embodiment, although directly creation of a Bluetooth link with the second device 220 may be performed by the first device 210 and although the third device 230 and the fourth device 240 may only monitor the first communication link 201 of the first device 210 with the second device 220, to prevent user confusion, the second device 220 may display the image 1121 indicating shapes of the third device 230 and the fourth device 240 rather than the image 1120 indicating the shape of the first device 210.

According to an embodiment, when the third device 230 or the fourth device 240 notifies the second device 220 of being connected with the second device 220 over the first communication link 201, when the first device 210 notifies the second device 220 that the third device 230 or the fourth device 240 are using the first communication link 201, or when the first device 210 is connected with the second device 220 over a fifth communication link 205, the second device 220 may change and display the image 1120 to the image 1121, in order to display a connection target.

According an embodiment, the user interface 1110 may include an indication indicating whether a connection to the third address of the first device 210 is accepted and may include information about the connection to the third address of the first device 210.

According to an embodiment, the second device 220 may establish the first communication link 201 with the first device 210, in response to receiving a user input 1140 requesting connection with the first device 210 or automatically without user input.

Hereinafter, an operation of an electronic device according to an embodiment will be described with reference to FIG. 12. Description of the same configurations as the embodiment described above will be omitted.

Figure 12:
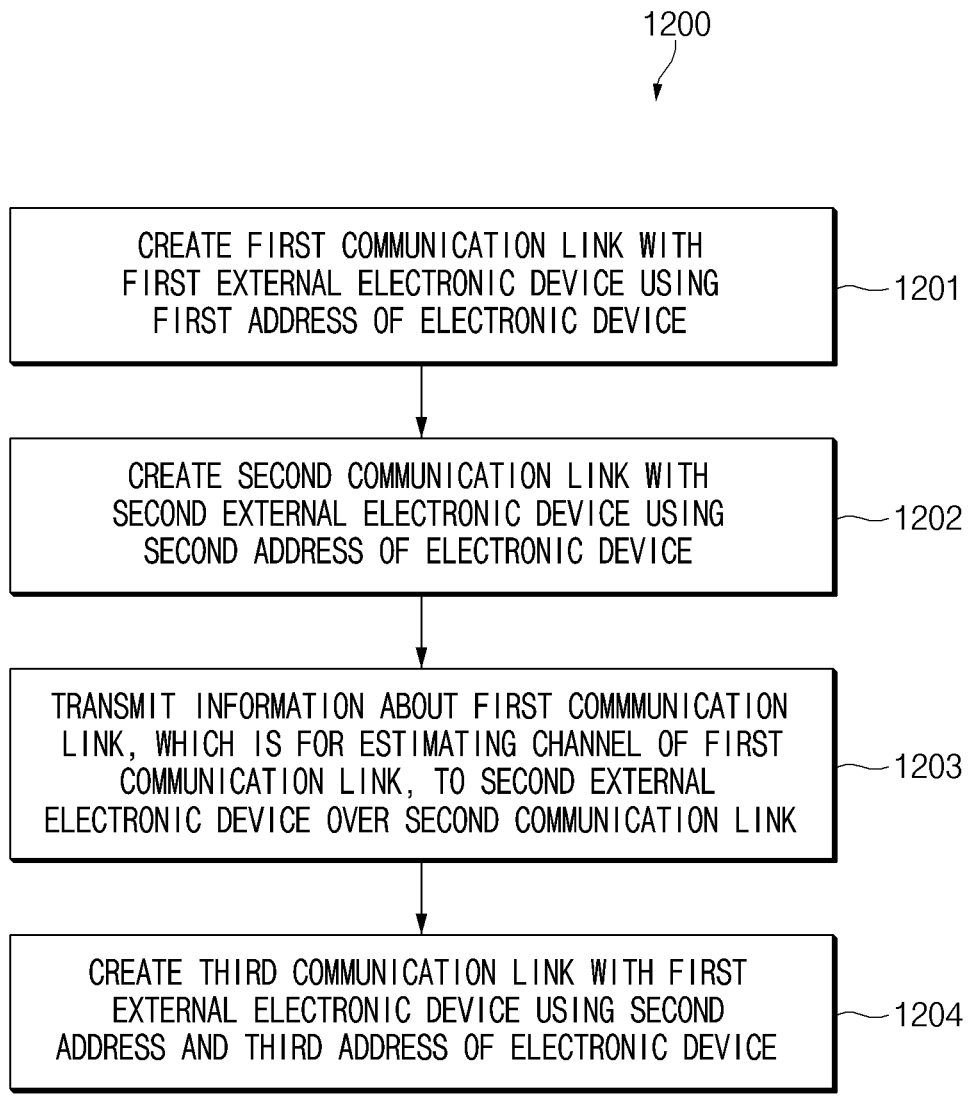
FIG. 12 is a flowchart illustrating an operation of an electronic device in a Bluetooth network environment according to an embodiment.

FIG. 12 is a flowchart illustrating an operation of an electronic device in a Bluetooth network environment according to an embodiment.

In operation 1201, an electronic device (e.g., first device 210 of FIG. 2) may establish a first communication link (e.g., first communication link 201 of FIG. 2) with a first external electronic device (e.g., second device 220 of FIG. 2) using a first address of the electronic device.

In operation 1202, the electronic device may establish a second communication link (e.g., second communication link 202 of FIG. 2) with a second external electronic device (e.g., third device 230 of FIG. 2) using a second address of the electronic device.

In operation 1203, the electronic device may transmit information associated with the first communication link, which is for estimating a channel of the first communication link, to the second external electronic device over the second communication link. The second external electronic device may monitor the first communication link based on the information about the first communication link.

In operation 1204, the electronic device may establish a third communication link (e.g., fifth communication link 205 of FIG. 6) with the first external electronic device using the second address or a third address of the electronic device. The electronic device and the first external electronic device may transmit and receive control information over the third communication link.

Hereinafter, an operation of an electronic device according to an embodiment will be described with reference to FIG. 13. Description of the same configurations as the embodiment described above will be omitted.

Figure 13:
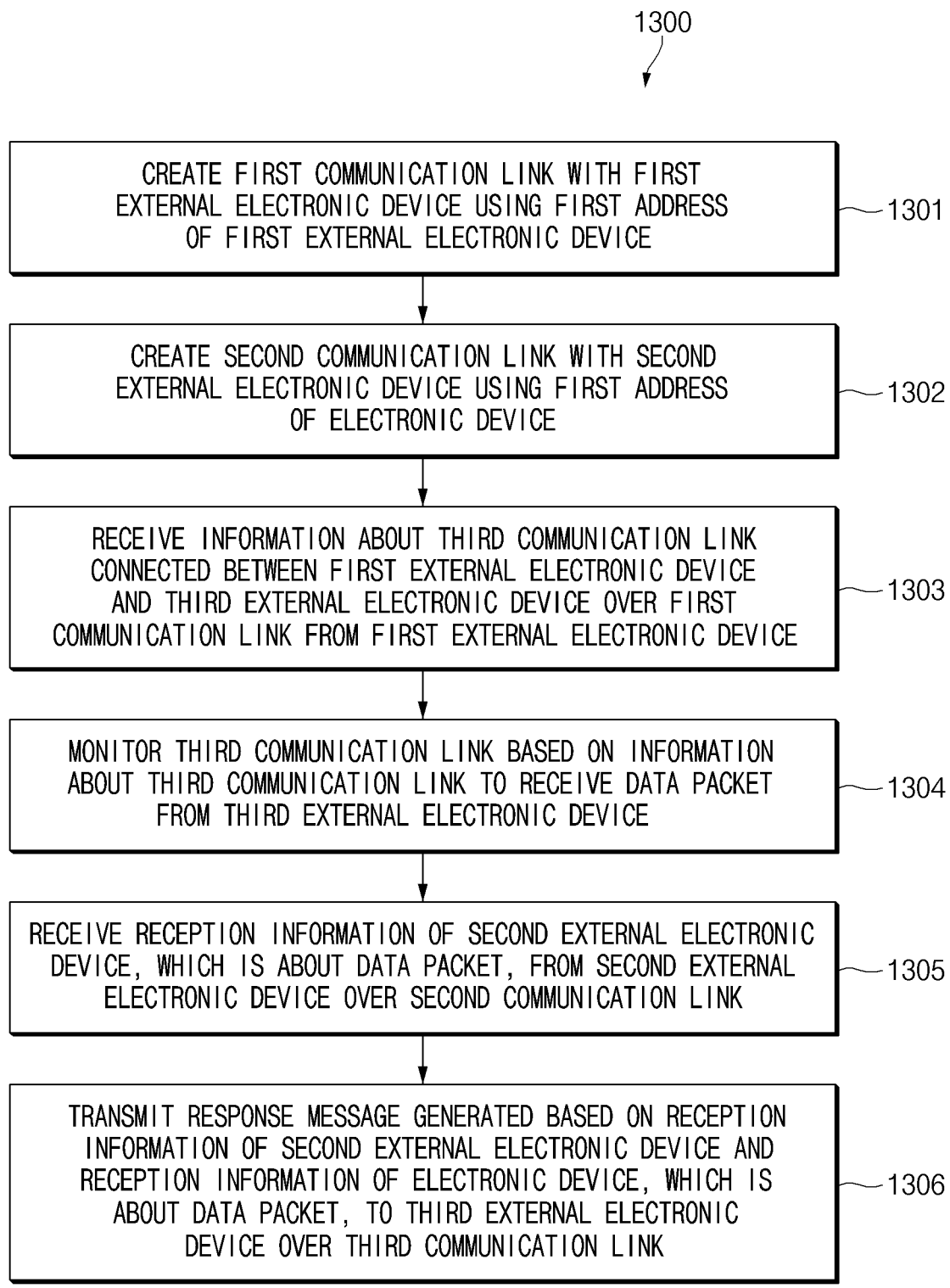
FIG. 13 is a flowchart illustrating an operation of an electronic device in a Bluetooth network environment according to an embodiment.

FIG. 13 is a flowchart illustrating an operation of an electronic device in a Bluetooth network environment according to an embodiment.

In operation 1301, an electronic device (e.g., third device 230 of FIG. 2) may establish a first communication link (e.g., second communication link 202 of FIG. 2) with a first external electronic device (e.g., first device 210 of FIG. 2) using a first address of the first external electronic device.

In operation 1302, the electronic device may establish a second communication link (e.g., fourth communication link 204 of FIG. 2) with a second external electronic device (e.g., fourth device 240 of FIG. 2) using a first address of the electronic device.

In operation 1303, the electronic device may receive information about a third communication link (e.g., first communication link 201 of FIG. 2) connected between the first external electronic device and a third external electronic device (e.g., second device 220 of FIG. 2) over the first communication link from the first external electronic device.

In operation 1304, the electronic device may monitor the third communication link based on the information about the third communication link to receive a data packet (e.g., data packet 501 of FIG. 5) from the third external electronic device.

In operation 1305, the electronic device may receive reception information (e.g., reception information 502 of FIG. 5) of the second external electronic device, which is about the data packet, from the second external electronic device over the second communication link.

In operation 1306, the electronic device may transmit a response message (e.g., a response message 503 of FIG. 5) generated based on the reception information of the second external electronic device and reception information of the electronic device, which is about the data packet, to the third external electronic device over the third communication link.

According to certain embodiments disclosed in the disclosure, each of two or more devices (e.g., the third device 230 and the fourth device 240) may receive a data packet over the first communication link 201 without the necessity of creating a link with the second device 220 which transmits a data packet (e.g., audio packet), thus reducing the complexity of connection and reducing a time delay due to repeated data packet transmission and power consumption according to repeated operation performance.

Furthermore, according to certain embodiments disclosed in the disclosure, the third device 230 and the fourth device 240 employing the disclosed sniffing operations may quickly and accurately interwork with the second device 220 which is an audio source to stably provide the user with high-quality sound.

Furthermore, according to certain embodiments disclosed in the disclosure, the first device 210 may deliver control information associated with call and/or music playback to the second device 220 over the fifth communication link 205 independently of the first communication link 201 where a data packet, such as an audio packet, is transmitted. Furthermore, the first device 210 may transmit state information such as battery information of the first device 210 to the second device 220 over the fifth communication link 205. Various control signals may be generated by means of the first device 210 to conveniently use the third device 230 and the fourth device 240.

An electronic device 210 according to an embodiment disclosed in the disclosure may include wireless communication circuitry, a processor operatively connected with the wireless communication circuitry, and a memory operatively connected with the processor. The memory may store one or more instructions that, when executed, cause the processor to establish a first communication link 201 with a first external electronic device 220 using a first address of the electronic device through the wireless communication circuitry, establish a second communication link 202 with a second external electronic device 230 using a second address of the electronic device 210 through the wireless communication circuitry, transmit information about the first communication link 201, the information configured for estimating a channel of the first communication link 201, to the second external electronic device 230 over the second communication link 202, and establish a third communication link 205 with the first external electronic device 220 using the second address or a third address of the electronic device 210, after transmitting the information about the first communication link 201 to the second external electronic device 230. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

In the electronic device 210 according to an embodiment disclosed in the disclosure, the one or more instructions may cause the processor to transmit control information associated with an application stored in the first external electronic device 220 to the first external electronic device 220 over the third communication link 205.

The electronic device 210 according to an embodiment disclosed in the disclosure may include a charging device of the second external electronic device 230. The second external electronic device 230 may include a sound output device.

In the electronic device 210 according to an embodiment disclosed in the disclosure, the one or more instructions may cause the processor to establish a fourth communication link 203 with a third external electronic device 240 using the second address of the electronic device 210 through the wireless communication circuitry and transmit the information about the first communication link 201 to the third external electronic device 240 over the fourth communication link 203.

In the electronic device 210 according to an embodiment disclosed in the disclosure, the information about the first communication link 201 may include information about the first address.

In the electronic device 210 according to an embodiment disclosed in the disclosure, the one or more instructions may cause the processor to attempt to connect with the third communication link 205 after receiving reception information for the information about the first communication link 201 from the second external electronic device 230 and/or identifying that the second external electronic device 230 is separated from a housing of the electronic device 210, after transmitting the information about the first communication link 201 to the second external electronic device 230.

The electronic device 210 according to an embodiment disclosed in the disclosure may include a user interface 1110 for receiving control information associated with the application.

The electronic device 210 according to an embodiment disclosed in the disclosure may include a sound output device.

An electronic device 210 according to an embodiment disclosed in the disclosure may include wireless communication circuitry, a processor operatively connected with the wireless communication circuitry, and a memory operatively connected with the processor. The memory may store one or more instructions that, when executed, cause the processor to establish a first communication link 202 with a first external electronic device 210 based on a first address of the first external electronic device 210 through the wireless communication circuitry, establish a second communication link 204 with a second external electronic device 240 using a first address of the electronic device 230 through the wireless communication circuitry, receive information about a third communication link 201 connected between the first external electronic device 210 and a third external electronic device 220 over the first communication link 202 from the first external electronic device 210, monitor the third communication link 201 based on the information about the third communication link 201 to receive a data packet from the third external electronic device 220, receive first reception information of the second external electronic device 240, the first reception information being about the data packet, from the second external electronic device 240 over the second communication link 204, and transmit a response message generated based on the first reception information of the second external electronic device 240 and second reception information of the electronic device 230, the second reception information being about the data packet, to the third external electronic device 220 over the third communication link 201.

The electronic device 230 according to an embodiment disclosed in the disclosure may include a sound output device. The first external electronic device 210 may include a charging device of the electronic device 230. The second external electronic device 240 may include a sound output device.

In the electronic device 230 according to an embodiment disclosed in the disclosure, the one or more instructions may cause the processor to, when the received first reception information of the second external electronic device 240 indicates ACK, set the response message to indicate the ACK when the second reception information of the electronic device 230 indicates the ACK and set the response message to indicate NACK when the second reception information of the electronic device 230 indicates the NACK.

In the electronic device 230 according to an embodiment disclosed in the disclosure, the one or more instructions may cause the processor to set the response message to indicate NACK when the first received reception information of the second external electronic device 240 indicates the NACK.

In the electronic device 230 according to an embodiment disclosed in the disclosure, the information about the third communication link may include information about a second address of the first external electronic device 210.

An electronic device 210 according to an embodiment disclosed in the disclosure may include wireless communication circuitry, a processor operatively connected with the wireless communication circuitry, and a memory operatively connected with the processor. The memory may store one or more instructions that, when executed, cause the processor to establish a first communication link 201 with a first external electronic device 220 using a first address of the electronic device 210 through the wireless communication circuitry, establish a second communication link 202 with a second external electronic device 230 using a second address of the electronic device 210 through the wireless communication circuitry, and transmit information about the first communication link 201, the information configured for estimating a channel of the first communication link 201, to the second external electronic device 230 over the second communication link 202. The second external electronic device 230 may include a sound output device, and the electronic device may include a charging device of the second external electronic device 230.

In the electronic device 210 according to an embodiment disclosed in the disclosure, the one or more instructions may cause the processor to establish a third communication link 205 with the first external electronic device 220 using the second address of the electronic device 210, after transmitting the information about the first communication link 201 to the second external electronic device 230.

In the electronic device 210 according to an embodiment disclosed in the disclosure, the one or more instructions may cause the processor to establish a third communication link 205 with the first external electronic device 220 using a third address of the electronic device 210, after transmitting the information about the first communication link 201 to the second external electronic device 230.

In the electronic device 210 according to an embodiment disclosed in the disclosure, the one or more instructions may cause the processor to transmit control information associated with an application stored in the first external electronic device 220 to the first external electronic device 220 over the third communication link 205.

In the electronic device 210 according to an embodiment disclosed in the disclosure, the one or more instructions may cause the processor to establish a fourth communication link 204 with the third external electronic device 240 using the second address of the electronic device 210 through the wireless communication circuitry and transmit the information about the first communication link 201 to the third external electronic device 240 over the fourth communication link 204.

In the electronic device 210 according to an embodiment disclosed in the disclosure, the one or more instructions may cause the processor to attempt to connect with the third communication link 205 after receiving reception information for the information about the first communication link 201 from the second external electronic device 230 and/or identifying that the second external electronic device 230 is separated from a housing of the electronic device 210, after transmitting the information about the first communication link 201 to the second external electronic device 230.

The electronic device 210 according to an embodiment disclosed in the disclosure may include a user interface 1110 for receiving control information associated with an application stored in the first external electronic device 220.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device configured to accommodate audio sink devices, comprising:
    wireless communication circuitry;
    a processor operatively connected with the wireless communication circuitry; and
    a memory operatively connected with the processor,
    wherein the memory stores one or more instructions that, when executed, cause the processor to:
    establish a first communication link with an audio source device using a first address of the electronic device through the wireless communication circuitry;
    establish a second communication link with a first external electronic device of the audio sink devices using a second address of the electronic device through the wireless communication circuitry;
    transmit information about the first communication link, the information configured for estimating a channel of the first communication link, to the first external electronic device of the audio sink devices over the second communication link;
    establish a third communication link with the first audio source device using a third address of the electronic device, after transmitting the information about the first communication link to the first external electronic device of the audio sink devices; and
    transmit control information associated with an application stored in the audio source device to the audio source device over the third communication link while content data packets from the audio source device being transmitted over the first communication link.

2. The electronic device of claim 1, further comprising:
    a user interface for receiving the control information associated with the application.

3. The electronic device of claim 1, further comprising:
    an audio input/output device.

4. The electronic device of claim 1, further comprising:
    a charging device of the audio sink devices,
    wherein the audio sink devices include a sound output device.

5. The electronic device of claim 1, wherein the one or more instructions cause the processor to:
    establish a fourth communication link with a second external electronic device of the audio sink devices, using the second address of the electronic device through the wireless communication circuitry; and
    transmit the information about the first communication link to the second external electronic device of the audio sink devices over the fourth communication link.

6. The electronic device of claim 1, wherein the information about the first communication link includes information about the first address of the electronic device.

7. The electronic device of claim 1, wherein the one or more instructions cause the processor to:
    attempt to connect with the third communication link after identifying that the audio sink devices are separated from a housing of the electronic device, after transmitting the information about the first communication link to the first external electronic device of the audio sink devices.

8. An electronic device configured to accommodate audio sink devices, comprising:
    wireless communication circuitry;
    a processor operatively connected with the wireless communication circuitry; and
    a memory operatively connected with the processor,
    wherein the memory stores one or more instructions that, when executed, cause the processor to:
    establish a first communication link with an audio source device using a first address of the electronic device through the wireless communication circuitry;
    establish a second communication link with a first external electronic device of the audio sink devices using a second address of the electronic device through the wireless communication circuitry;
    transmit information about the first communication link, the information configured for estimating a channel of the first communication link, to the first external electronic device of the audio sink devices over the second communication link;
    establish a third communication link with the audio source device using a third address of the electronic device, after transmitting the information about the first communication link to the first external electronic device of the audio sink devices; and
    transmit control information associated with an application stored in the audio source device to the audio source device over the third communication link while content data packets from the audio source device being transmitted over the first communication link,
    wherein each of the audio sink devices includes a sound output device, and
    wherein the electronic device further comprises a charging device of the audio sink devices.

9. The electronic device of claim 8, wherein the one or more instructions cause the processor to:
    attempt to connect with the third communication link after identifying that the audio sink devices are separated from a housing of the electronic device, after transmitting the information about the first communication link to the first external electronic device of the audio sink devices.

10. The electronic device of claim 8, wherein the one or more instructions cause the processor to:
    establish a fourth communication link with a second external electronic device of the audio sink devices using the second address of the electronic device through the wireless communication circuitry; and
    transmit the information about the first communication link to the second external electronic device of the audio sink devices over the fourth communication link.

11. The electronic device of claim 8, further comprising:
a user interface for receiving control information associated with an application stored in the audio source device.

* * * * *